United States Patent [19]
Edwards et al.

[11] Patent Number: 5,888,270
[45] Date of Patent: Mar. 30, 1999

[54] COPPER CONVERTING

[75] Inventors: James Scott Edwards, Mount Isa; Shafi Jahanshahi, Doncaster, both of Australia

[73] Assignees: Mount Isa Mines Ltd., Brisbane; Commonwealth Scientific and Industrial Research Organisation, Campbell, both of Australia

[21] Appl. No.: 750,440

[22] PCT Filed: Jun. 27, 1995

[86] PCT No.: PCT/AU95/00379

§ 371 Date: Dec. 13, 1996

§ 102(e) Date: Dec. 13, 1996

[87] PCT Pub. No.: WO96/00802

PCT Pub. Date: Jan. 11, 1996

[30] Foreign Application Priority Data

Jun. 30, 1994 [AU] Australia ............................ PM 6577

[51] Int. Cl.⁶ .................................................. C22B 15/06
[52] U.S. Cl. .............................. 75/643; 75/377; 75/644; 75/645
[58] Field of Search ............................. 75/377, 643, 644, 75/645

[56] References Cited

U.S. PATENT DOCUMENTS

| | | | |
|---|---|---|---|
| 1,922,301 | 8/1933 | Kekich | 75/643 |
| 3,832,163 | 8/1974 | Themelis | 75/74 |
| 3,890,139 | 6/1975 | Suzuki et al. | 75/74 |
| 4,308,058 | 12/1981 | Makipirtti et al. | 75/76 |
| 4,830,667 | 5/1989 | Marcuson et al. | 75/76 |
| 5,281,252 | 1/1994 | Landolt et al. | 75/585 |

FOREIGN PATENT DOCUMENTS

| | | |
|---|---|---|
| 403 167 | 5/1968 | Australia . |
| 573 925 | 6/1988 | Australia . |

OTHER PUBLICATIONS

Derwent Abstract, Accession No. 61621A34, SU 274915A (Gipronikel Res. Inst.), 10 Dec. 1977.
Derwent Abstract, Accession No. 93–074219/09, SU 1721109A (Lengd Plekhanov Mine), 23 Mar. 1992.
Derwent Abstract, Accession No. 92–022174/03, SU 1625896A (Sibe Sibtsvetmetnii), 7 Feb. 1991.

Primary Examiner—Melvyn Andrews
Attorney, Agent, or Firm—Kenyon & Kenyon

[57] ABSTRACT

A process for converting a copper sulphide matte and/or a copper sulphide concentrate to blister copper is described which comprises the steps of adding the matte and/or concentrate together with a suitable flux to an agitated molten bath containing molten slag phase and a molten metal phase; injecting by means of a submerged lance an oxidizing gas capable of reacting with the matte or concentrate to form a low sulphur blister copper phase, slag and sulphur dioxide; controlling the injection of the oxidizing gas such that a substantial portion of the gas contracts the blister copper phase; and separating blister copper from the bath. It is possible to obtain an amount of sulphur in the blister copper which is within a factor of two of the equilibrium value for a given percentage of copper in the slag.

22 Claims, 10 Drawing Sheets

COPPER CONVERTING

FIELD OF THE INVENTION

This invention relates to a process for producing blister copper using a submerged lance.

BACKGROUND OF THE INVENTION

The traditional process for extraction of copper from copper containing ores involves smelting to form a matte and then converting to form blister copper.

The conversion of copper matte is carried out in a Pierce Smith Converter, a process having increasing difficulty meeting environmental standards. The Pierce Smith converter routinely produces copper having a low sulphur content (<0.1 wt % S).

In recent years, lance technology has been developed which has the advantage of allowing high furnace throughput at comparatively low capital cost and with lower cost and increased effectiveness in meeting environmental standards. This technology has been applied to smelting and converting continuously in separate furnaces or successively in a single furnace.

In one such process copper sulphide matte is continuously oxidized to produce blister copper and slag by means of non submerged vertical lances directed onto the surface of a shallow large diameter furnace bath ("Mitsubishi Process"). Under typical operating conditions, the blister copper has a sulphur content in the range of from 0.1 to 1.0 wt %.

It is desirable to minimise the sulphur content of blister copper as even a small increment in the sulphur content is disadvantageous in the anode furnace downstream of the converter. Lower sulphur content can be obtained with the Mitsubishi process but this generally results in an increase in the percentage of copper which reports to slag and must be recycled thus reducing the overall efficiency of the process.

Theory predicts that there is an equilibrium concentration of sulphur in the blister copper at a given concentration of copper in the slag. However, it has not been possible to operate the known lance processes so as to obtain a low sulphur content (that is to say a sulphur content approaching the calculated equilibrium value) and the sulphur content in the blister is typically more than twice the predicted equilibrium sulphur content for any given copper-in-slag concentration.

DISCLOSURE OF THE INVENTION

It is an object of the present invention to provide a lance based process which is able to produce blister copper of a lower sulphur content for a given copper-in-slag concentration than such processes presently produce.

It is an object of preferred embodiments of the invention to provide a means for control of a lance based copper converting process which will allow blister copper of a desired low sulphur content to be reliably produced. According to one aspect, the invention includes a process for converting a copper sulphide matte and/or a copper sulphide concentrate to blister copper comprising the steps of:

adding the matte and/or concentrate together with a suitable flux to an agitated continuous molten slag phase into which the matte and/or concentrate is dispersed, and with which the matte and/or concentrate rapidly reacts, the continuous slag phase floating on a continuous molten blister copper phase, an interface being located between the continuous slag phase and the continuous blister copper phase;

injecting by means of a submerged lance an oxidizing gas capable of reacting with the matte or concentrate to form a blister copper containing a low sulphur content blister, slag and sulphur dioxide;

the lance tip being located deep within the continuous slag phase at a depth selected in relation to said slag/blister copper interface so as to ensure that a substantial portion of the gas contacts the blister copper phase; and separating blister copper from the continuous slag phase.

Desirably, the controlling step comprises the step of adjusting the depth of immersion of the lance tip relative to the altitude of the surface of the blister copper layer. In highly preferred embodiments of the invention the bath is deep in relation to its width, for example, the depth to diameter ratio is on average, greater than 0.2.

According to a second aspect, the invention includes a process for converting a copper sulphide matte and/or a copper sulphide concentrate to blister copper comprising the steps of:

adding the matte and/or concentrate together with a suitable flux to an agitated continuous molten slag phase into which the matte and/or concentrate is dispersed, and with which the matte and/or concentrate rapidly reacts, the continuous slag phase floating on a continuous molten blister copper phase, an interface being located between the continuous slag phase and the continuous blister copper phase;

injecting by means of a submerged lance an oxidizing gas capable of reacting with the continuous slag phase and continuous blister copper phase, the continuous slag phase in turn reacting with the matte or concentrate to form a blister copper containing a low sulphur content, slag and sulphur dioxide;

the lance tip being located deep within the continuous slag phase, the depth of the lance tip being adjusted relative to the slag/blister copper interface so as to minimize the percentage of sulphur in the blister copper at a target copper-in-slag concentration and at a depth adjacent to said interface so as to ensure that a substantial portion of the gas contacts the blister copper phase; and separating blister copper from the continuous slag phase.

PREFERRED EMBODIMENTS OF THE INVENTION

The reaction is typically conducted in a furnace, and the blister copper forms a layer on the bottom of the furnace with the slag floating on the top. Preferably, the slag is highly oxidised and the preferred main components consist of a solution of copper oxide, calcium oxide, ferric and ferrous oxides, and silica.

The copper sulphide matte added to the molten bath is typically comprised of a mixture of $Cu_2S$ and FeS and is desirably produced by smelting copper sulphide concentrates in a smelting furnace.

The matte added is preferably granulated prior to addition to the molten bath. The granulated matte or concentrate typically has an average particle size less than 25 mm, more preferably less than 10 mm. The matte can be granulated in water, or slow cooled and crushed. The matte and/or concentrate is preferably fed to the top surface of the molten bath.

The flux is typically limestone and under some circumstances silica and the oxidizing gas is typically air or oxygen enriched air. The oxidizing gas is injected vertically downward to beneath the surface of the slag by means of one or more lances, preferably a "Sirosmelt" lance such as is described in U.S. Pat. No. 4,251,271. The oxidizing gas helps maintain the bath in an agitated condition. Coal and/or oil may also be injected down the lance as fuel to attain the required stoichiometric requirements. Preferably the oxygen stoichiometry is from 90% to 120%, more preferably from 105% to 110%.

Preferably the slag layer is a deep layer thereby allowing time for the copper sulphide matte or copper sulphide concentrate added to melt and react with the slag. Temperatures used are typically of the order of from 1200° C. to 1300° C. Preferably the ratio of CaO/Fe in the slag is of the order of from 0.15 to 0.7, the ratio of $CaO/SiO_2$ is of the order of from 5 to 10 and the concentration of residual $MgO+Al_2O_3$ is of the order of from 3.5 to 4.5 wt %.

Preferably the lance tip is positioned in the molten bath in the slag layer adjacent the blister copper layer. It is believed that by injecting a substantial portion of the oxidizing gas directly into the blister copper layer, copper at the point of contact is converted into copper oxide which floats to the interface between the blister copper and slag layers and reacts with any copper sulphide matte or concentrate which has reached the interface, or alternatively the copper oxide is dissolved or dispersed in the slag to react with the matte or concentrate. The copper oxide also assists in the desulphurisation of the copper and improves the utilization of oxygen by the sulphur with concomitant reduction of the sulphur content of the blister copper and of copper losses to the slag.

The matte is maintained as a dispersion in the slag phase. By maintaining the matte as a dispersion, reaction between matte and slag is maximised and reaction between the matte and blister copper is minimised. This is most preferably achieved by operating the process by feeding matte in particulate form onto the surface of the molten bath, maintaining a deep slag phase, ensuring the slag is well agitated by the injected gas and injecting a substantial portion of the oxygen into the blister copper phase via a deeply submerged lance.

Advantageously, lump coal is added to the bath to create another reaction zone in the slag where reduction may occur. The deep lance practice ensures a recirculating slag flow pattern that provides adequate contact by the majority of the slag melt with this reduced reaction zone. This significantly reduces the copper content of the slag for a given sulphur content in blister.

It is desirable to achieve an amount of sulphur in the blister copper of less than 0.1 wt %. Low sulphur blister copper contents are achieved by injecting oxygen deep in the furnace directly into the copper layer. The copper product can be used directly for fire refining in conventional anode furnaces without causing excessive oxidation times to remove residual sulphur.

The equilibrium between copper in slag and sulphur in blister can be represented by the reaction:

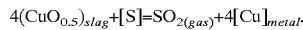

$4(CuO_{0.5})_{slag}+[S]=SO_{2(gas)}+4[Cu]_{metal}.$

FIG. 1 shows the theoretical chemical equilibrium concentrations for both sulphur in blister copper and copper in slag using a partial pressure of $SO_2$ of 0.26 atm. It will be appreciated by those skilled in the art that the equilibrium curve is dependent on the partial pressure of $SO_2$. The theoretical concentrations were calculated using commercial thermochemical software assuming conditions appropriate to converting and the copper behaved as a sub-regular solution and the slag behaved as a regular solution.

However, in the past it has not been possible to achieve concentrations of sulphur even approaching the calculated value in a lance based process on a reproducible basis.

By performing the invention it is possible to obtain a blister copper containing a wt % of sulphur which is within a factor of two of the equilibrium value for a given percentage of copper in the slag.

In preferred embodiments, this low sulphur content can be achieved reliably and reproducibly at a pilot scale (greater than 200 kg batch). Moreover in some cases a lower wt % sulphur in the blister is obtained than would be predicted from consideration of the overall equilibrium, indicating that different local equilibrium may apply under selected conditions.

BRIEF DESCRIPTION OF THE DRAWINGS

The invention will be described in more detail by way of example only with reference to the following examples and drawings in which.

EXAMPLE 1

Figure 2:
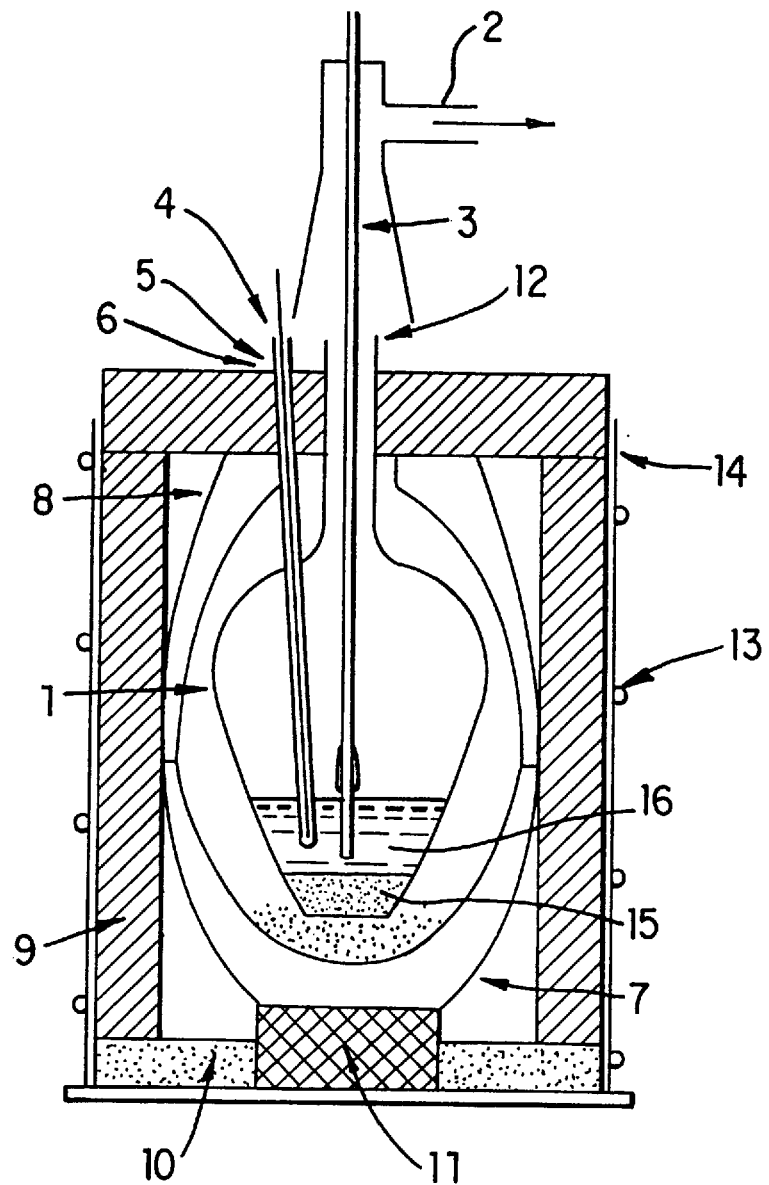
FIG. 2 is a schematic drawing of a kilogram scale Sirosmelt apparatus used in the examples.

Experiments were conducted in a kilogram Sirosmelt apparatus as shown in FIG. 2. As can be seen from FIG. 2, the apparatus comprised a high-alumina vase shaped porcelain crucible 1 and alumina tube 12, having a flue 2 positioned adjacent thereto to allow gases to escape to be cooled and forwarded to a bag house (not shown) for fume collection. An alumina lance 3 (5 mm O.D) was provided in the flue 2. A thermocouple 4 (Pt/Pt-13% Rh) in an alumina thermocouple sheath 5 was cemented into an angled hole 6 in the top of the crucible 1, the tip of the thermocouple being about 2 cm from the bottom. In the experiments, the crucible was contained with two silicon carbide crucibles 7, 8 which were in turn surrounded by a Kaowool blanket 9 and alumina bubble 10. The bottom of the crucible was placed on a refractory brick 11. Copper tubing 13 was positioned externally of the apparatus for water cooling. A rolled copper sheet induction coil 14 was also provided.

Copper matte was lightly crushed and screened to remove oversize lumps and fine particles and contained <0.01 wt % $Al_2O_3$, 0.16 wt % CaO, 43.0 wt % Cu, 27.9 wt % Fe, 9.7 wt % $Fe_3O_4$, 0.08 wt % MgO, 0.27 wt % Pb, 22.6 wt % S, 0.58 wt % $SiO_2$ and 0.27 wt % Zn. The crucibles were charged with copper 15 and a calcium ferrite slag 16. The starting copper metal contained scrap copper (from solid rod and clean copper pipe) and recycled blister from previous tests. Calcium ferrite slag were prepared from commercial calcite (>99% purity), ferric oxide and iron powder, the latter being mixed in a proportion to yield the desired $Fe^{2+}/Fe^{3+}$ ratio. Calcite flux pellets were prepared and dried at 105° C.

Three tests were performed using various lance depths. Prior to feeding and converting the matte, a starting bath of copper and slag was prepared. The crucible containing copper under a blanket of nitrogen was heated externally by heat radiation from susceptors (which were heated by radio frequency induction) to the required temperature. After reaching the preset temperature, the molten copper bath was stirred with injected nitrogen and the starting slag slowly added, time was then allowed for the molten bath to reach equilibrium. Copper matte together with flux were then added via the flue and oxygen via the lance at predetermined rates to begin converting. Solid rates were controlled by using a constant weighed addition every minute and the gas flow rates were controlled by pre-calibrated mass flow controllers. Metal and slag samples were collected every 10 minutes. This sampling interval was considered suitable as sufficient feed had been added to alter the blister/slag chemistry if the system was not at a steady state. At the start of the converting interval, addition of matte and flux preceded the air blowing by a few seconds to allow the matte lumps to heat up and melt. For the last thirty seconds of the converting interval, when all the matte and flux had been added, only smelting air was injected into the bath. This ensured the correct volumetric addition of air. At the end of each interval, a short settling time was allowed before the slag and copper phases were sampled. After sampling converting recommenced with the total feeding time between one and two hours.

The blister phase was sampled by dipping a silica tube into the metal phase and applying a small amount of suction from a volumetric suction pipette. Between 5 and 10 grams was removed and quenched quickly. The surface of the metal samples was polished and the rods were cut to ensure that no matte or slag was entrained in the sample. Metal in excess of analysis requirements was returned to the crucible. Slag was sampled by a steel dip rod, which was then quenched in water. The sulphur content of the blister copper was determined using a Leco CS-44 carbon/sulphur determinator. Slag samples were pulverised and examined for metallic copper which was removed. The slag was analysed for major oxides and sulphur using an inductively coupled plasma (ICP) technique. The proportion of total iron as ferrous was determined using a standard wet chemical method. The titration results were corrected for the interference from the aqueous reaction between $Cu^+$ and $Fe^{3+}$, which occurs upon acid digestion.

Hot gases and fumes generated during each test were drawn through steel ducting into the baghouse, where the particulate matter accumulated on glass fibre filter papers. At the end of each experiment, the fume and dust which had settled in the ducting and on the filter paper were collected.

Details of the experiments performed are listed in the following table (all experiments were performed at 1300° C.):

| | Starting Bath | | Solid Rates | | $O_2$ Stoichiometry | | Gas Rates | | Injection | |
|---|---|---|---|---|---|---|---|---|---|---|
| Test | Metal g | Slag g | Matte g/h | Calcite g/h | Stoich. % | $po_2$ atm. | $O_2$ l/h | $N_2$ l/h | Depth cm | Phase |
| 1 | 400 | 400 | 250 | 70 | 94 | 0.21 | 53.4 | 200.4 | 1–2 | slag |
| 2 | 400 | 800 | 250 | 70 | 94 | 0.21 | 53.4 | 200.4 | 3–4 | slag |
| 3 | 400 | 400 | 250 | 70 | 94 | 0.21 | 53.4 | 200.4 | 1–2 | metal |

Test 1

Figure 3:
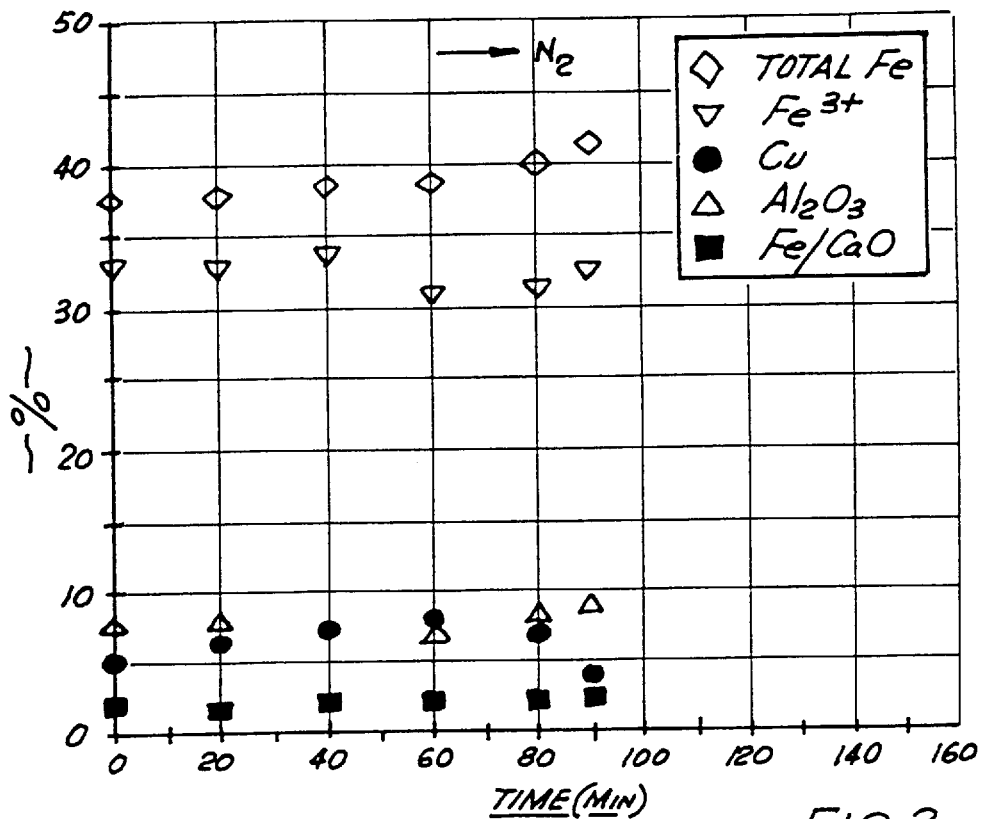
FIG. 3 is a graph of slag composition (wt % or wt ratio) as a function of time during a converting process having the specified conditions listed in Test 1 of Example 1.
Figure 4:
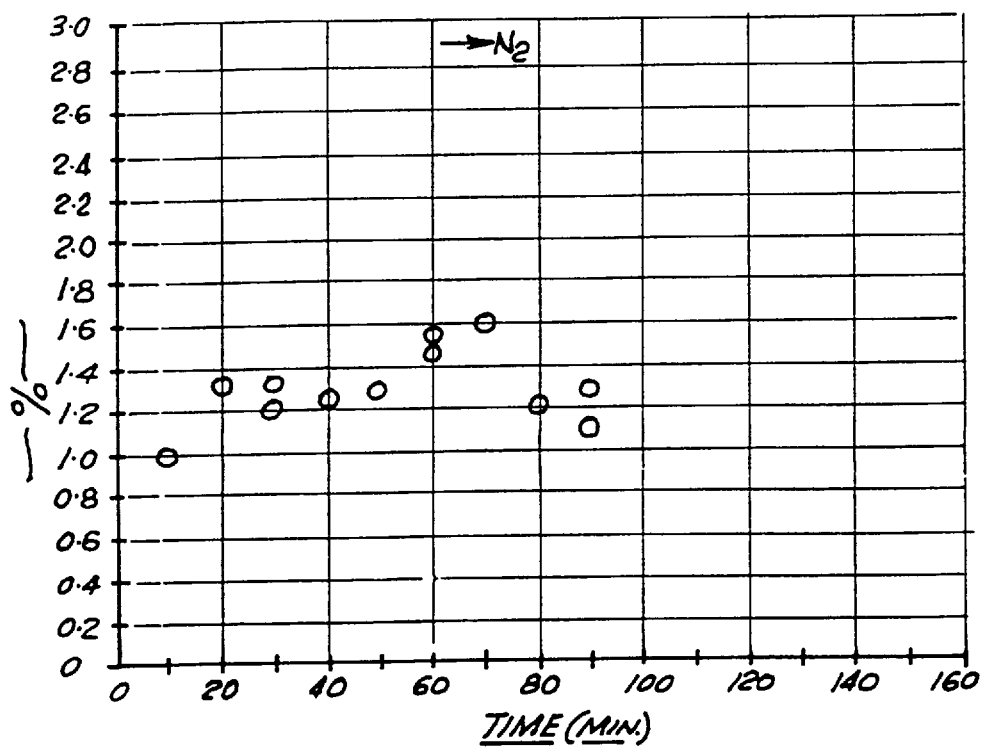
FIG. 4 is a graph of the concentration of sulphur in the blister (wt %) as a function of time during a converting process having the specified conditions listed in Test 1 of Example 1.

A starting bath was prepared containing 398 g of slag and 400 g of copper. Air was injected at a rate of 253.8 l/h to give an oxygen stoichiometry of 94% and an oxygen partial pressure of 0.21 atm. The air was injected 1–2 cm into the slag. Feeding was continued for 1 h, followed with stirring for 0.5 h under a blanket of nitrogen. The composition of the slag throughout the experiment is shown in FIG. 3. The composition of sulphur in the blister is shown in FIG. 4.

It can be seen that the amount of copper in the final slag was quite low, about 8 wt % whilst the amount of sulphur in the blister was high at about 1.3 wt %. 108 g of copper were added via matte and the amount of copper in the final matte was 20 g. 4 g of copper were lost to slag. The overall copper recovery was 73 g corresponding to a recovery of 70%.

The slag composition during converting was Cu 6.4%, $Fe^{3+}/Fe_{tot}$ 0.83, CaO/Fe 0.625 and S 0.57%.

Test 2

Figure 5:
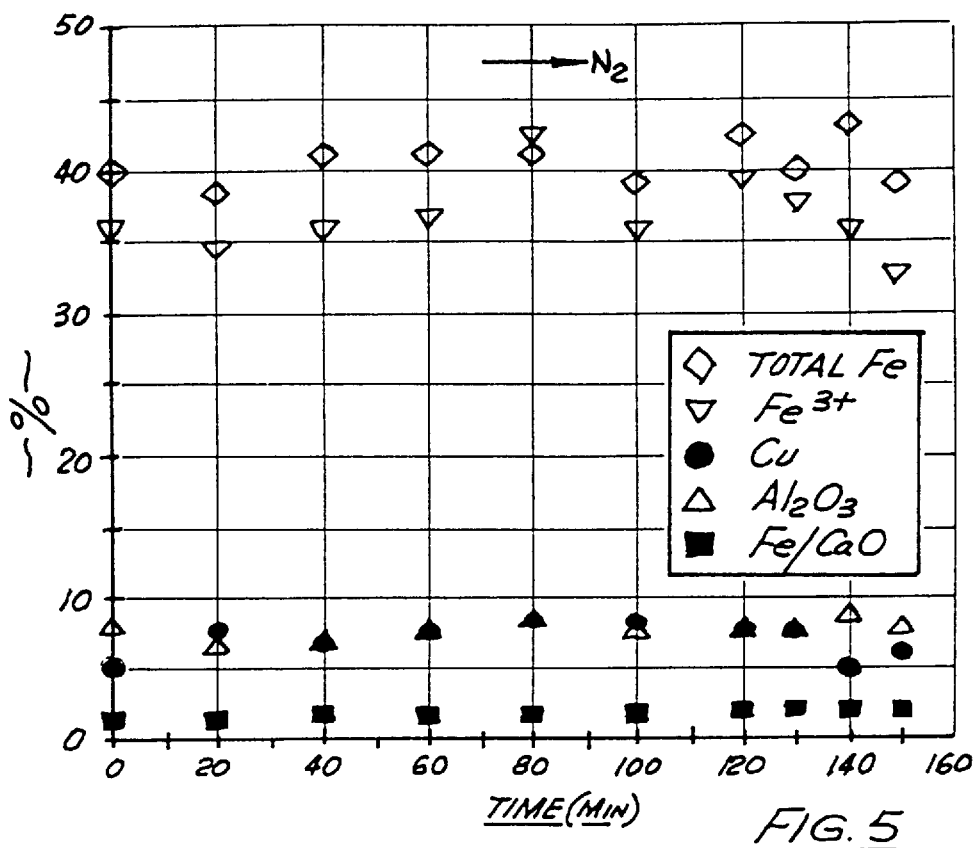
FIG. 5 is a graph of slag composition (wt % or wt ratio) as a function of time during a converting process having the specified conditions listed in Test 2 of Example 1.
Figure 6:
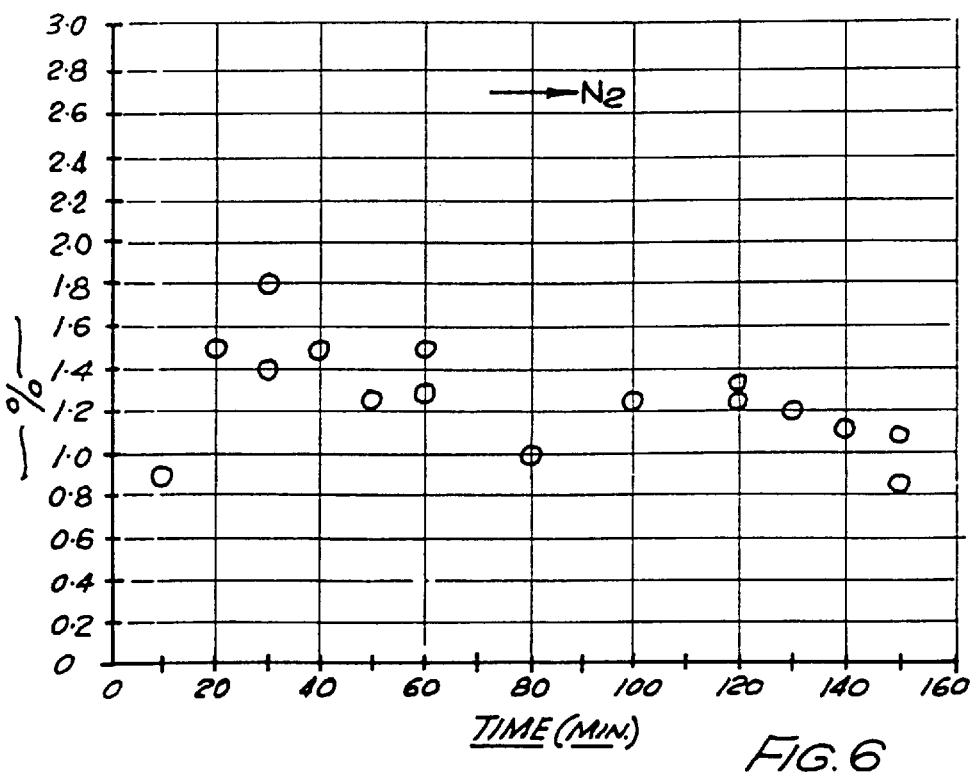
FIG. 6 is a graph of the concentration of sulphur in the blister (wt %) as a function of time during a converting process having the specified conditions listed in Test 2 of Example 1.

A starting bath was prepared containing 800 g of slag and 400 g of copper. Air was injected at a rate of 253.8 l/h to give an oxygen stoichiometry of 94% and an oxygen partial pressure of 0.21 atm. The air was injected 3–4 cm into the slag. Feeding was continued for 2 h, followed with stirring for 0.5 h under a blanket of nitrogen. The composition of the slag throughout the experiment is shown in FIG. 5. The composition of sulphur in the blister is shown in FIG. 6.

It can be seen that the amount of copper in the final slag was quite low, about 7 wt % whilst the amount of sulphur in the blister was high at about 1.0 wt %. 214 g of copper was added via matte and the amount of copper in the final matte was 30 g. 22 g of copper were lost to slag. The overall copper recovery was 156 g corresponding to a recovery of 72%.

The slag composition during converting was Cu 7.1%, $Fe^{3+}/Fe_{tot}$ 0.91, CaO/Fe 0.625 and S 0.33%.

Test 3

Figure 7:
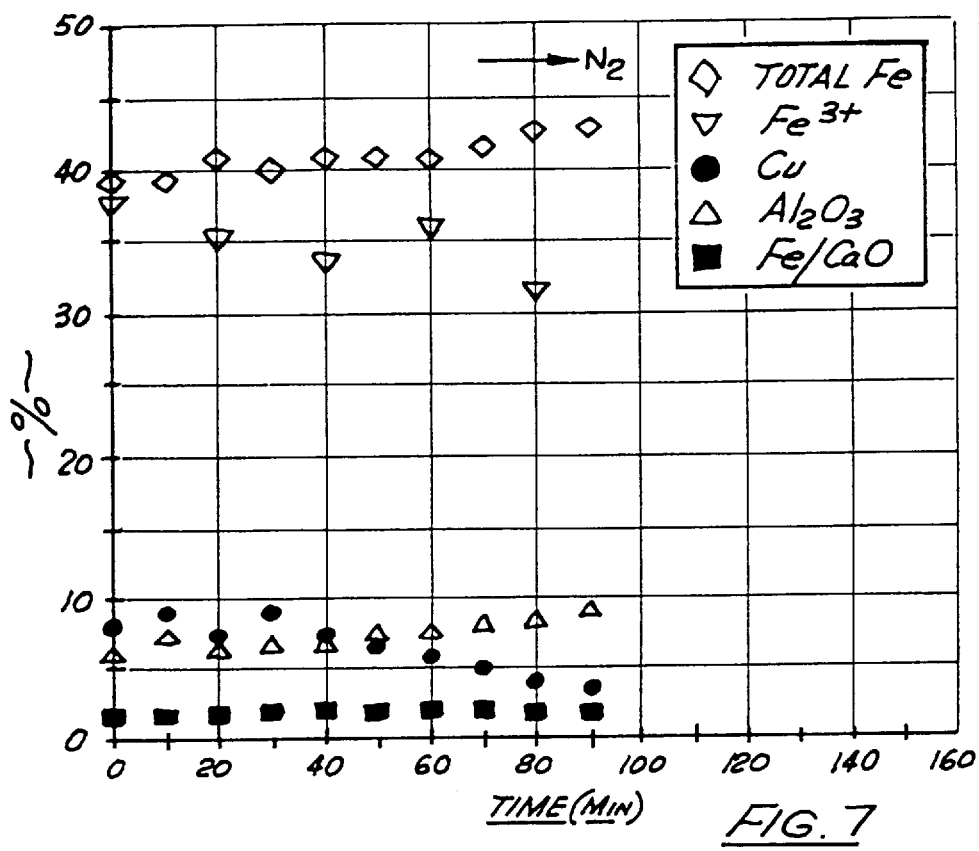
FIG. 7 is a graph of slag composition (wt % or wt ratio) as a function of time during a converting process having the specified conditions listed in Test 3 of Example 1.
Figure 8:
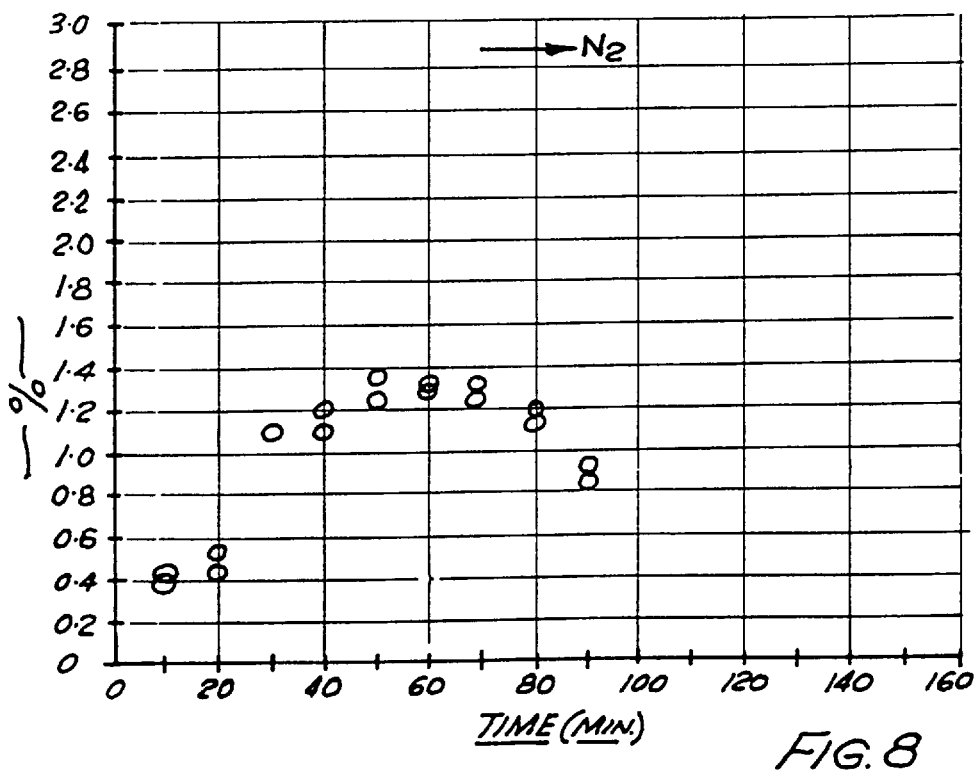
FIG. 8 is a graph of the concentration of sulphur in the blister (wt %) as a function of time during a converting process having the specified conditions listed in Test 3 of Example 1.

A starting bath was prepared containing 400 g of slag and 400 g of copper. Air was injected at a rate of 253.8 l/h to give an oxygen stoichiometry of 94% and an oxygen partial pressure of 0.21 atm. The air was injected 1–2 cm into the metal. Feeding was continued for 1 h, followed with stirring for 0.5 h under a blanket of nitrogen. The composition of the slag throughout the experiment is shown in FIG. 7. The composition of sulphur in the blister is shown in FIG. 8.

It can be seen that the amount of copper in the final slag was quite low, about 3 wt % whilst the amount of sulphur in the blister was high at about 0.8 wt %. 108 g of copper was added via matte and the amount of copper in the final matte was 6 g. No copper was lost to slag. The overall copper recovery was 106 g corresponding to a recovery of 95%. It is unlikely that a steady state was attained.

The slag composition during converting was Cu 7.5%, $Fe^{3+}/Fe_{tot}$ 0.87, CaO/Fe 0.59 and S 0.29%.

During each experiment, the calcium ferrite slags dissolved up to 8% alumina, the major source of which was from dissolution of the lance at the hot tip and crucible material. Silica analysis showed that the typical level was of the order of 5 wt %, the major source of which was contamination from the crucibles and tubes used for metal sampling. A comparison of the results show that oxygen utilization and copper recovery are affected by lance immersion depth. Increasing immersion depth in the slag phase appeared to increase the $Fe^{3+}$ ratio, but had little effect on the copper recovery. Air injection into the copper phase increased oxygen utilisation and copper recovery and resulted in a lower $Fe^{3+}/Fe_{tot}$ ratio with a reduced mass of residual matte.

EXAMPLE 2

Figure 1:
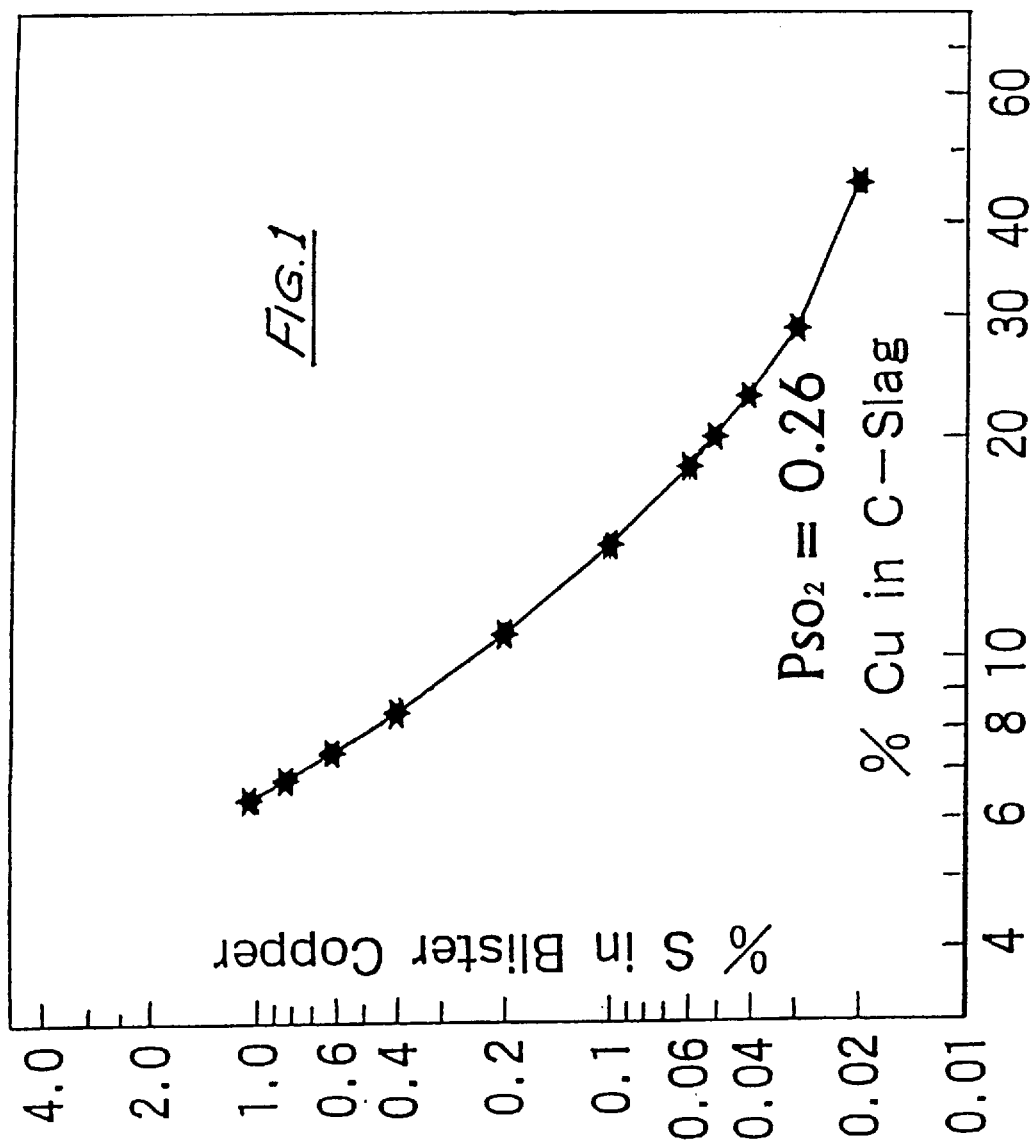
FIG. 1 is a graph showing the theoretical relationship between copper in calcium ferrite slag and sulphur in blister copper at a partial pressure of $SO_2$ of 0.26 atm.

The kilogram scale apparatus was used as shown in FIG. 1 except that the porcelain crucibles were replaced with impervious magnesia crucibles with porcelain lids. The experimental procedure was also practically identical to that followed in Example 1. The same copper matte was also used and prepared as in Example 1. The initial copper bath was produced from commercial solid copper rod. Calcium ferrite slags were prepared from commercial calcite (>99% purity), ferric oxide and copper oxide. These materials were dried, mixed and then sintered at a temperature of 1000° C. to form a robust aggregate. Calcite flux pellets were prepared and dried at 105° C. Three tests were carried out and a summary of the conditions and process variables are listed in the following table:

| | | Solid Rates | | $O_2$ Stoichiometry | | Gas Rates | | Injection | |
| --- | --- | --- | --- | --- | --- | --- | --- | --- | --- |
| Test | Temperature °C. | Matte g/h | Calcite g/h | Stoich. % | $Po_2$ atm. | $O_2$ l/h | $N_2$ l/h | Depth cm | Phase |
| 1 | 1300 | 250 | 70 | 105 | 0.21 | 57.1 | 217.1 | 1–2 | slag |
| 2 | 1300 | 250 | 70 | 105 | 0.21 | 57.1 | 217.1 | 2–3 | slag |
| 3 | 1300 | 250 | 70 | 105 | 0.21 | 57.1 | 217.1 | 0–1 | metal |

The sulphur content of the copper samples were determined using a Leco CS-44 Carbon/Sulphur determinator. Slag samples were pulverised and screened to remove most of the metal which may have been entrained in the dip sample. The slag was assayed for major oxides and sulphur using an inductively coupled plasma (ICP) technique. The proportion of the total iron as ferrous was determined using the standard wet chemical method. The titration results were corrected for the interference from the aqueous reaction between $Cu^+$ and $Fe^{3+}$, which occurs upon acid digestion.

Test 1

Figure 9:
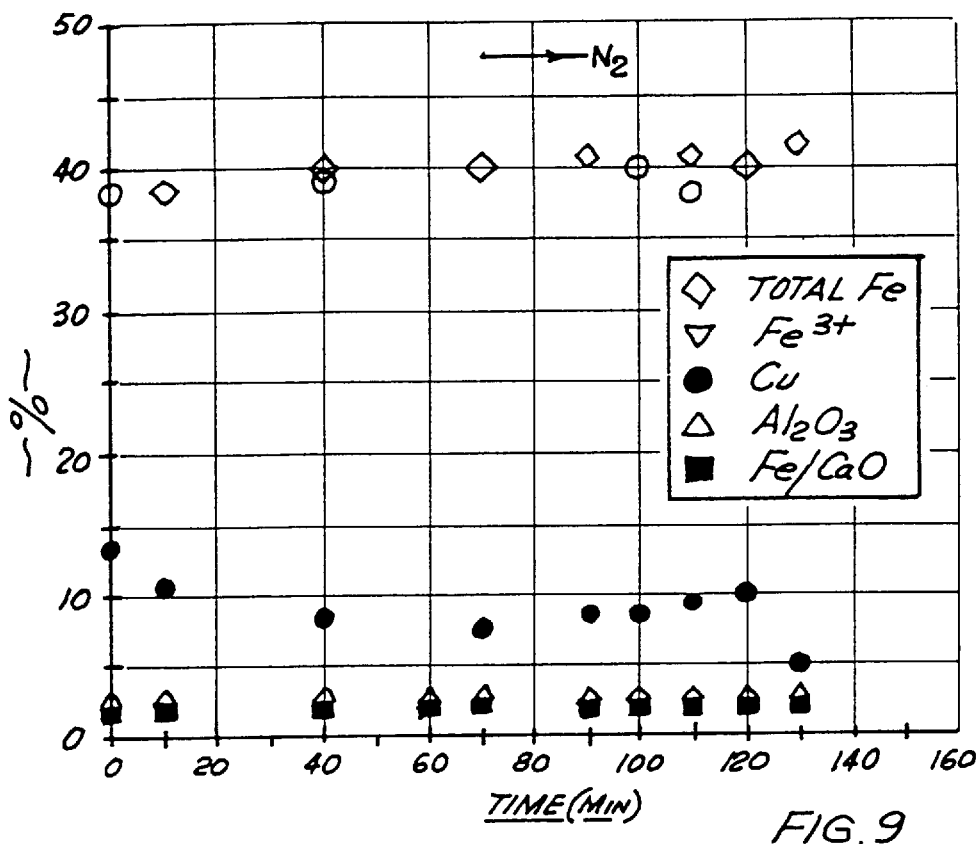
FIG. 9 is a graph of slag composition (wt % or wt ratio) as a function of time during a converting process having the specified conditions listed in Test 1 of Example 2.
Figure 10:
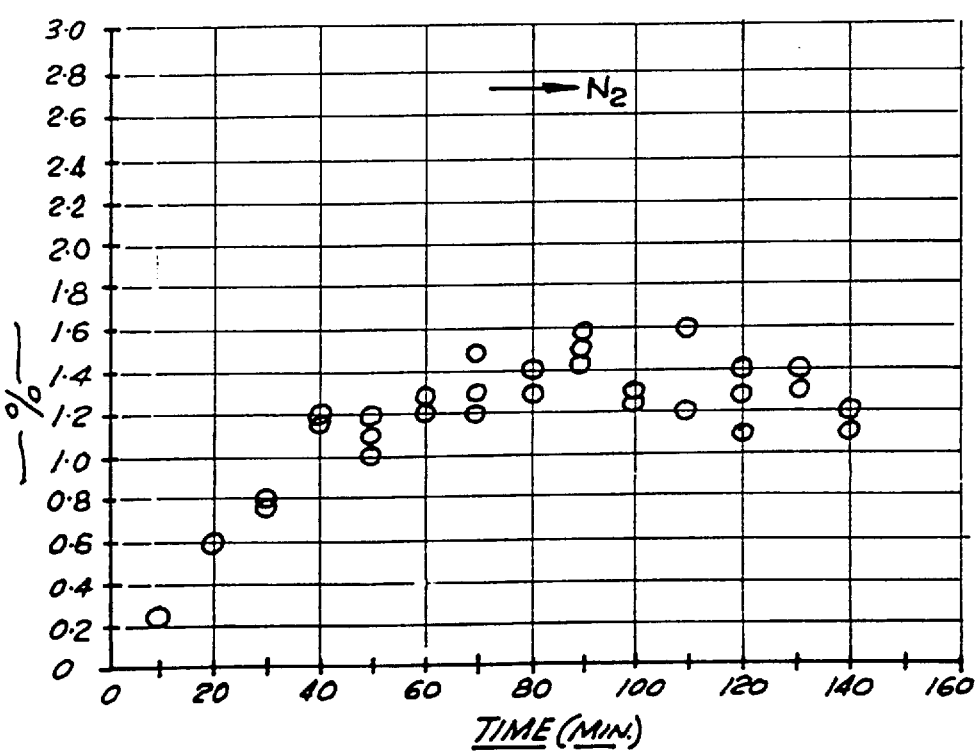
FIG. 10 is a graph of the concentration of sulphur in the blister (wt %) as a function of time during a converting process having the specified conditions listed in Test 1 of Example 2.

The starting bath contained 440 g of slag and 370 g of copper. Air was injected at a rate of 274.2 l/h to give an oxygen stoichiometry of 105% and an oxygen partial pressure of 0.21 atm. Injection of the gas was 1–2 cm into the slag. The converting was conducted for 2 hours followed by 0.5 h stirring under a blanket of nitrogen. The slag assay throughout the experiment is shown in FIG. 9. The amount of sulphur in the blister throughout the test is shown in FIG. 10.

It can be seen that the amount of copper in the final slag was quite low, about 8 wt % whilst the amount of sulphur in the blister was high at about 1.4 wt %.

The copper balance was as follows:

Copper metal initially: 370 g

Copper in initial slag: 60 g

Copper in added matte: 215 g

Copper in final slag: 64 g

Final Copper: 498 g

Copper partition: 59% to metal.

The slag composition during converting was Cu 8.1%, $Fe^{3+}/Fe_{tot}$ 0.94, CaO/Fe 0.625 and S 0.57%.

Test 2

Figure 11:
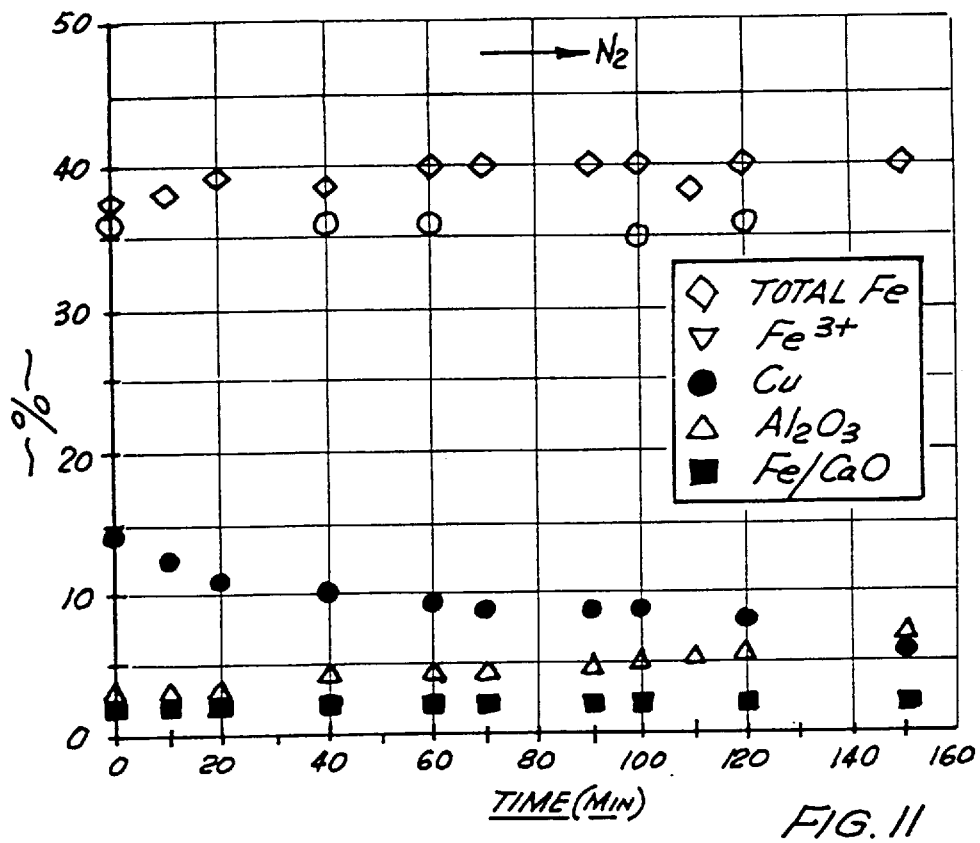
FIG. 11 is a graph of slag composition (wt % or wt ratio) as a function of time during a converting process having the specified conditions listed in Test 2 of Example 2.
Figure 12:
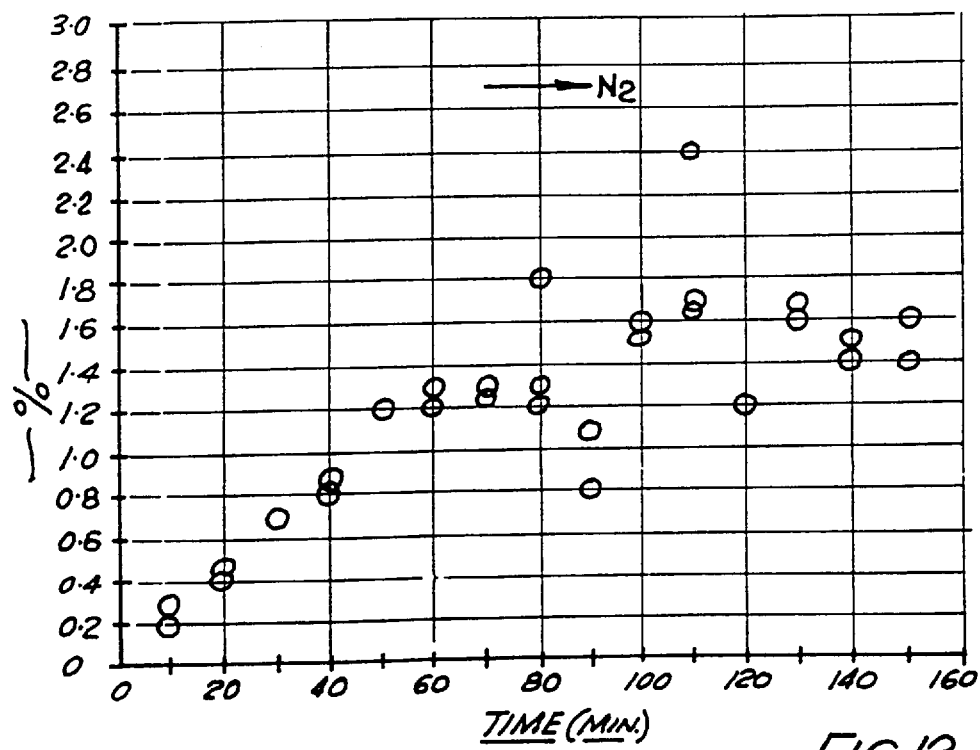
FIG. 12 is a graph of the concentration of sulphur in the blister (wt %) as a function of time during a converting process having the specified conditions listed in Test 2 of Example 2.

The starting bath contained 400 g of slag and 400 g of copper. Air was injected at a rate of 274.8 l/h to give an oxygen stoichiometry of 105% and an oxygen partial pressure of 0.21 atm. Injection of the gas was 2–3 cm into the slag. The converting was conducted for 1.83 hours followed by 0.5 h stirring under a blanket of nitrogen. The slag assay throughout the experiment is shown in FIG. 11. The amount of sulphur in the blister throughout the test is shown in FIG. 12.

It can be seen that the amount of copper in the final slag was quite low, about 9 wt % whilst the amount of sulphur in the blister was high at about 1.5 wt %.

The copper balance was as follows:

Copper metal initially: 370 g

Copper in initial slag: 62 g

Copper in added matte: 215 g

Copper in final slag: 68 g

Copper in final matte: 12 g

Final Copper: 548 g

Copper partition: 82% to metal.

The slag composition during converting was Cu 9.9%, $Fe^{3+}/Fe_{tot}$ 0.91, CaO/Fe 0.617 and S 0.33%.

Test 3

Figure 13:
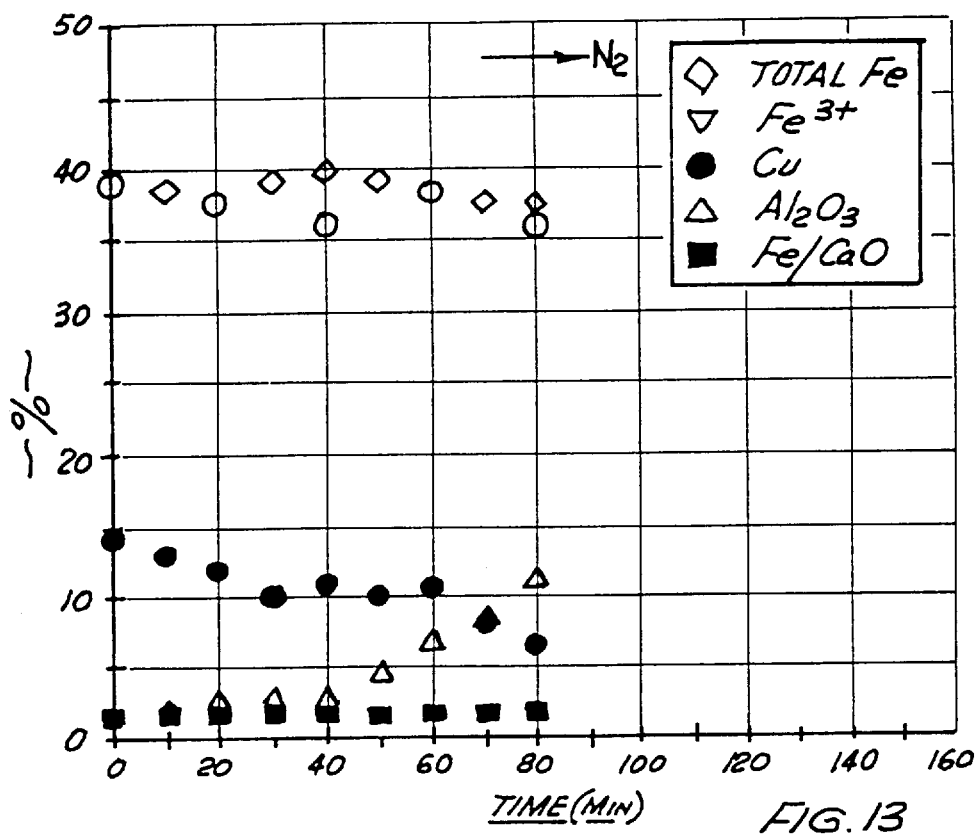
FIG. 13 is a graph of slag composition (wt % or wt ratio) as a function of time during a converting process having the specified conditions listed in Test 3 of Example 2.
Figure 14:
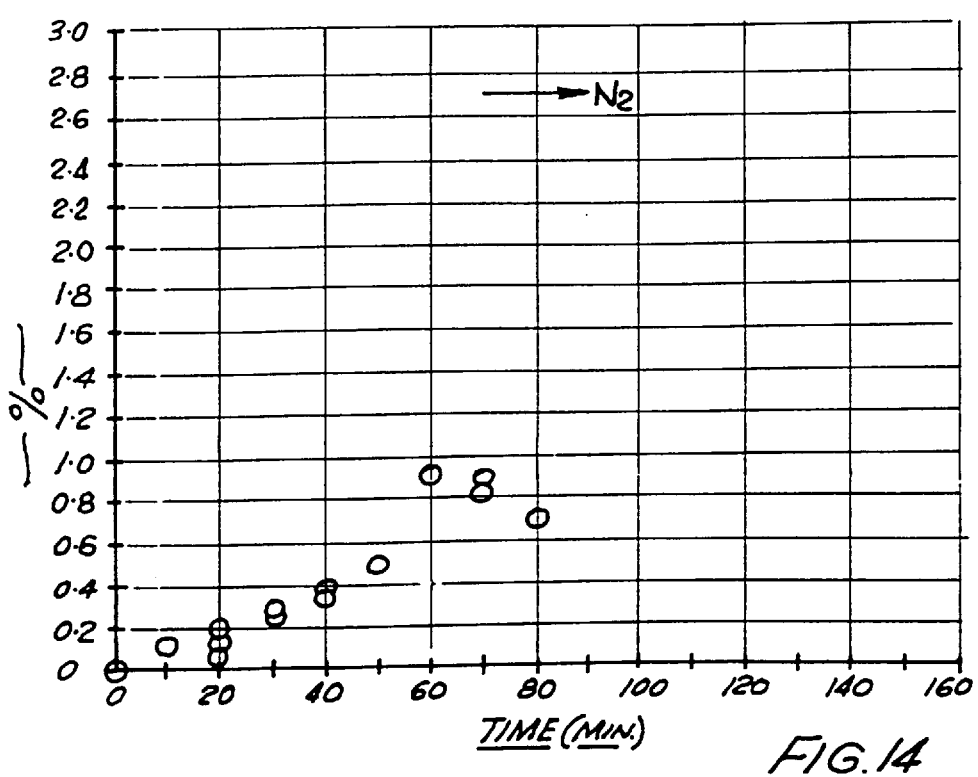
FIG. 14 is a graph of the concentration of sulphur in the blister (wt %) as a function of time during a converting process having the specified conditions listed in Test 3 of Example 2.

The starting bath contained 400 g of slag and 400 g of copper. Air was injected at a rate of 274.8 l/h to give an oxygen stoichiometry of 105% and an oxygen partial pressure of 0.21 atm. Injection of the gas was 0–1 cm into the metal. The converting was conducted for 1.33 hours. The slag assay throughout the experiment is shown in FIG. 13. The amount of sulphur in the blister throughout the test is shown in FIG. 14.

It can be seen that the amount of copper in the final slag was quite low, about 7 wt % and the amount of sulphur in the blister was less than about 1 wt %. The test was not completed due to excessive lance breakage. The copper balance was as follows:

Copper metal initially: 370 g

Copper in initial slag: 63 g

Copper in added matte: 143 g

Copper in final slag: 76g

Final Copper: 445 g

Copper partition: 52% to metal.

The slag composition during converting was Cu 9.9%, $Fe^{3+}/Fe_{tot}$ 0.97, CaO/Fe 0.613 and S 0.6%.

Figure 15:
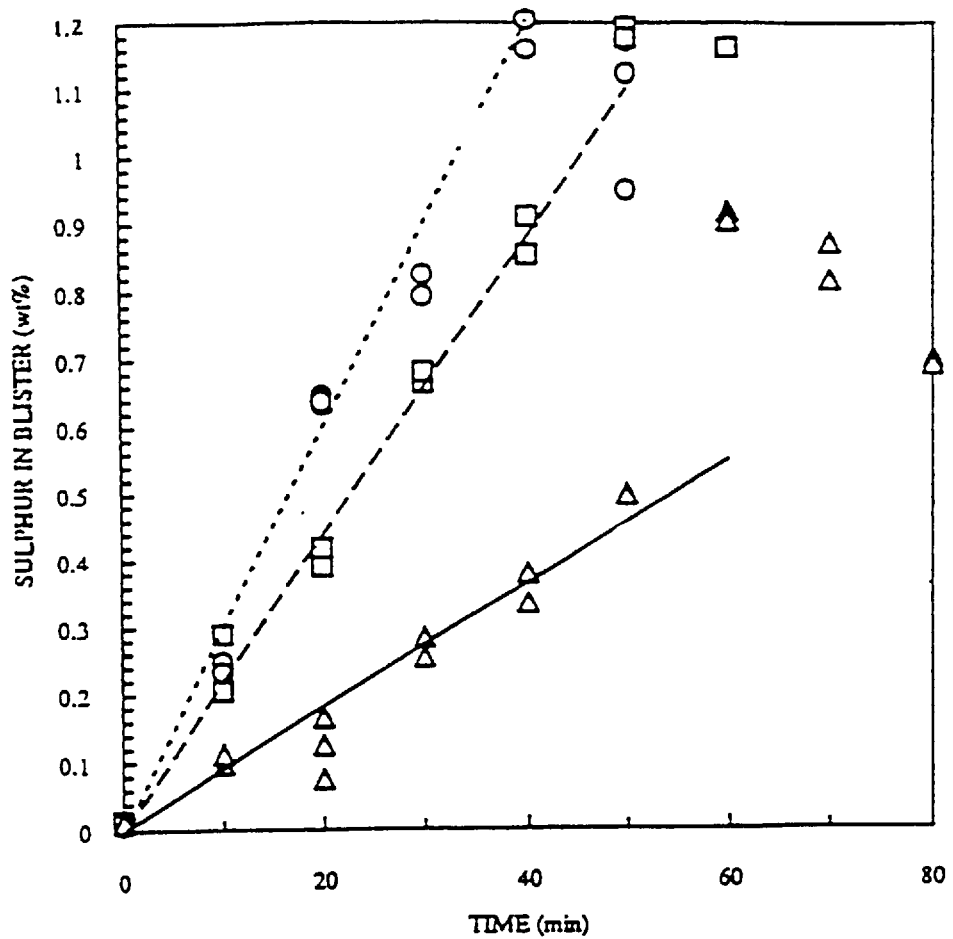
FIG. 15 is a graph of the concentration of sulphur in blister (wt %) as a function of time for the various lance depths used in Tests 1, 2 and 3 of Example 2 wherein "--------" is 1–2 cm into the slag, "---" is 3–4 cm into the metal and "———" is 0–1 cm into the metal.

Oxygen utilizations were of the order of 97%. The magnesia levels in the starting slags was consistently about 2%. Average sulphur levels in the slags ranged between 0.3 and 0.6 wt %. Silica levels in the slags were less than 1%, primarily from the feed matte. A comparison of the results for all three tests shows that the initial sulphur levels in the blister phase was low and slowly increased during the tests. The rate of sulphur capture by the blister phase is a measure of oxygen utilisation. A slow rate of sulphur capture indicates more sulphur is being released from the system as $SO_2$ and hence the oxygen utilisation is higher. The rate of sulphur capture by the blister at the three immersion depths is shown in FIG. 15. The initial rate of sulphur transfer was linear. As the immersion depth increased, the sulphur removal increased and consequently the oxygen utilization increased. There was no significant difference in the amount of copper lost to slag in each test.

EXAMPLE 3

The same kilogram scale Sirosmelt apparatus as described in Example 2 was used to assess the feasibility of converting concentrates to blister copper directly without the production of an intermediate matte phase. A steel lance was used in test 1 but this was changed to an alumina lance for the rest of tests.

Copper concentrates were dried and then pelletised using a 10% copper sulphate solution as binder. The green pellets produced were then dried at 130° C. for about 4 hours. The pellets were of a size between 2 and 7 mm and contained 28.4 wt % Cu, 28.0 wt % Fe, 0.17 wt % Ca, 30.6 wt % S, 1.65 wt % Si and 0.35 wt % Al. Calcite flux (>99% purity) was also pelletised with water being used as the binder, the green pellets being dried at 130° C. for about 4 hours. A starting bath was prepared in magnesia crucibles containing calcium ferrite slag and copper metal. The slag was prepared from ferric oxide, calcite powder, silica powder and alumina powder and on heat up contained 300 g Cu, 57.3% ferric oxide, 26% lime, 7% silica, 1.7% alumina, 5% ferrous oxide and 2.4% magnesia. In tests 4, 5, 6 and 7, CuO was also added to the starting bath. The copper metal phase was prepared from copper rod, scrap copper tubing and copper recycled from previous tests.

The dry powders were mixed and charged to the magnesia crucible together with starting copper prior to each test. The composition of the slag was maintained during each test by impurity elements in the copper concentrate, alumina dissolved from the lance and magnesia dissolved from the crucible. The ferrous content of the starting bath was produced from the reduction of ferric oxide by copper metal. In tests 4, 5, 6 and 7 38.1 g of CuO was also added to the starting bath.

Seven tests were performed using various lance depths. The tests were conducted similarly to Examples 1 and 2. Prior to the start of each experiment the starting bath was prepared. The starting material was heated to the starting temperature under a blanket of nitrogen. After reaching the set temperature, the bath was stirred with nitrogen for about 10 minutes to allow the slag and metal phases to approach equilibrium. Prior to the start of each test, slag and blister samples were taken and the lance height was adjusted to the required depth. Converting commenced with the addition of the copper concentrate together with flux via the flue and oxygen via the lance at predetermined rates. Pre-weighed concentrate and flux were added every 20 minutes and the gas flow rate was controlled by pre-calibrated mass flow controllers. Converting continued for 3 hours. The lance was then removed and the bath allowed to settle under a blanket of nitrogen. During the test, metal and slag samples were collected every 20 minutes. For the last minute of the sampling interval, when all of the concentrate and flux had been added, only air was added to the bath. This ensured that all of the concentrate had melted and reacted before the blister and slag samples were collected. At the end of the 20 minute period the lance was removed, the bath was allowed to settle for 1 minute and the samples were collected. After sampling, converting was allowed to continue with the addition of concentrate, air and flux. The samples were collected and analysed by the same manner as in Examples 1 and 2. The blister samples were analysed immediately and provided a feedback on the oxidation potential of the bath. This allowed adjustments to be made to the air flow and hence oxygen stoichiometry during each test could be made so as to control the content of the blister to about 0.1 wt % without excessive oxidation of the blister phase. Steady state was generally achieved about 60 minutes after a change in a variable. Details of the experiments performed are listed in the following table:

| Test | Temp. | Starting Bath (g) | | | Feed rate (g/h) | | Initial air flow | | Lance |
|---|---|---|---|---|---|---|---|---|---|
| | | new | recycle | | | | | | |
| No. | (°C.) | copper | copper | Slag | cons | calcite | stoich | (l/min) | practice |
| 1 | 1240 | 300 | 0 | 300 | 250 | 82.9 | 105 | 6.3 | deep |
| 2 | 1240 | 174 | 126 | 300 | 250 | 82.9 | 107.5 | 6.5 | deep |
| 3 | 1240 | 98 | 202 | 300 | 250 | 82.9 | 105 | 6.3 | deep |
| 4 | 1200 | 7 | 293 | 300 | 250 | 82.9 | 105 | 6.3 | deep |
| 5 | 1200 | 20 | 280 | 300 | 250 | 66 | 103 | 6.2 | deep |
| 6 | 1240 | 300 | 0 | 300 | 250 | 82.9 | 105 | 6.3 | shallow |
| 7 | 1240 | 300 | 0 | 300 | 250 | 82.9 | 110 | 6.6 | shallow |

Test 1

In this test, the blowing depth was 3–4 cm into the blister copper, the oxygen stoichiometry was 105–110% and the CaO content of the slag was 20–26%. Metal and slag analyses throughout the process are in the following table:

| Time | % Oxy | S in | Slag Analysis Wt % | | | | | | | | |
|---|---|---|---|---|---|---|---|---|---|---|---|
| min | Stoich. | Cu | CaO | $SiO_2$ | $Al_2O_3$ | Cu | MgO | Si | $Fe_{tot}$ | $Fe^{2+}$ | $Fe^{3+}$ |
| 0 | 105 | 0.06 | 30.22 | 4.58 | 1.44 | 2.07 | 1.82 | 0.20 | 42.00 | 9.31 | 32.69 |
| 20 | 105 | 2.10 | 24.06 | 3.49 | 1.66 | 7.97 | 1.79 | 0.94 | 41.30 | 17.80 | 23.50 |
| 40 | 105 | 0.90 | 24.20 | 3.66 | 3.04 | 9.28 | 1.62 | 0.70 | 37.50 | 13.80 | 23.70 |
| 60 | 105 | 1.60 | 24.20 | 3.91 | 4.44 | 10.70 | 1.28 | 0.77 | 36.50 | 16.20 | 20.30 |
| 80 | 105 | 2.20 | 23.22 | 4.34 | 5.20 | 6.86 | 1.38 | 0.41 | 38.10 | 12.50 | 25.60 |
| 100 | 110 | 1.40 | 25.32 | 4.11 | 5.35 | 5.36 | 1.01 | 0.32 | 37.40 | 11.60 | 25.80 |
| 120 | 110 | 1.60 | 24.62 | 4.00 | 6.52 | 10.70 | 0.90 | 1.02 | 36.10 | 15.20 | 20.90 |
| 140 | 110 | 0.40 | 23.36 | 4.00 | 5.71 | 11.00 | 1.08 | 0.37 | 37.80 | 9.04 | 25.76 |
| 160 | 110 | 0.40 | 23.36 | 4.04 | 5.86 | 11.20 | 0.95 | 0.25 | 37.80 | 11.40 | 26.40 |
| 180 | 110 | 0.10 | 22.38 | 3.98 | 5.35 | 14.30 | 0.86 | 0.23 | 37.40 | 14.70 | 22.70 |
| 200 | 110 | 0.02 | 19.87 | 4.04 | 5.05 | 14.80 | 0.90 | 0.23 | 34.20 | 17.90 | 16.30 |
| 220 | 107 | 0.02 | 19.87 | 2.59 | 4.76 | 21.10 | 0.81 | 1.05 | 33.80 | 19.90 | 13.90 |
| 224 | 0 | — | 20.99 | 3.70 | 5.35 | 20.20 | 0.61 | 0.33 | 32.60 | 19.00 | 13.60 |
| 304 | 0 | 0.05 | 20.71 | 3.79 | 5.33 | 19.10 | 0.73 | 0.22 | 34.10 | 17.80 | 16.30 |

It can be seen that the final slag contained about 20% copper and there was <0.1%S in the blister copper. This is close to equilibrium concentrations. The copper balance was as follows:

copper metal initially: 330 g;
copper in concentrate: 253 g;
copper in final slag: 154 g;
copper: 429 g;
copper partition: 74% to metal The slag composition during converting was $Al_2O_3$ 5%, MgO 1%, Fe 37%, $Fe^{3+}/Fe_{tot}$ (corr) 0.96, CaO/Fe 0.6 and S<0.1%.

Test 2

In this test, the blowing depth was 3–4 cm into lister copper, the oxygen stoichiometry was 105–107% and the CaO content of the slag was 19–26%. Metal and slag analyses throughout the process are in the following table:

| Time | % Oxy | S in | Slag Analysis Wt % | | | | | | | | |
|---|---|---|---|---|---|---|---|---|---|---|---|
| min | Stoich. | Cu | CaO | $SiO_2$ | $Al_2O_3$ | Cu | MgO | S | $Fe_{tot}$ | $Fe^{2+}$ | $Fe^{3+}$ |
| 0 | 107 | .01 | 24.90 | 5.20 | 1.74 | 7.48 | 0.98 | 0.12 | 40.7 | 11.3 | 29.4 |
| 20 | 107 | .5 | 23.36 | 6.27 | 2.27 | 12.8 | 0.78 | 0.25 | 41.7 | 11.9 | 29.8 |
| 40 | 107 | .1 | 21.96 | 5.43 | 2.70 | 15 | 0.70 | 0.17 | 39.2 | 16 | 23.2 |
| 60 | 107 | .1 | 22.10 | 5.71 | 2.78 | 13.9 | 0.65 | 0.16 | 39.7 | 14.8 | 24.9 |
| 80 | 107 | .2 | 21.82 | 5.95 | 2.89 | 14.3 | 0.65 | 0.17 | 37.9 | 11.6 | 26.3 |
| 100 | 107 | .03 | 20.85 | 5.95 | 3.16 | 14.3 | 0.63 | 0.14 | 37.4 | 16.6 | 20.8 |
| 120 | 107 | .04 | 17.91 | 6.27 | 2.99 | 10.6 | 0.71 | 0.13 | 37 | 14 | 23 |
| 140 | 105 | .02 | 17.91 | 6.78 | 2.99 | 17.3 | 0.61 | 0.12 | 38.4 | 18.7 | 19.7 |
| 160 | 105 | .02 | 19.31 | 6.16 | 3.18 | 21.7 | 0.71 | 0.12 | 319 | 18.3 | 14.6 |
| 180 | 105 | .04 | 18.75 | 5.75 | 3.38 | 16.8 | 0.93 | 0.12 | 34.1 | 18.8 | 15.3 |
| 200 | 0 | .04 | 20.57 | 6.91 | 3.99 | 17.5 | 0.60 | 0.56 | 31.8 | 16.2 | 15.6 |
| 220 | 0 | .05 | 20.01 | 6.99 | 4.12 | 17.9 | 0.75 | 0.34 | 33.4 | 16.5 | 16.9 |

A steady state was achieved after about 100 minutes. It can be seen that the final slag contained 18% copper and there was <0.05% S in the blister copper. This is close to equilibrium concentrations. The copper balance was as follows:

Copper metal initially: 330.5 g;

Copper in concentrate: 215.3 g;

Copper in final slag: 106 g;

Copper: 440 g;

Copper partition: 81% to metal

The slag composition during converting was $Al_2O_3$ 3–4%, MgO 0.7–1.0%, Fe 37–38%, $Fe_{3+}/Fe_{tot}$ (corr) 0.98, CaO/Fe 0.6 and S<0.5%.

Test 3

In this test, the blowing depth was 3–4 cm into the blister copper, the oxygen stoichiometry was 105–100% and the CaO content of the slag was 21–26%. Metal and slag analyses throughout the process are shown in the following table:

| Time | % Oxy | S in | Slag Analysis Wt % | | | | | | | | |
|---|---|---|---|---|---|---|---|---|---|---|---|
| min | Stoich. | Cu | CaO | $SiO_2$ | $Al_2O_3$ | Cu | MgO | S | $Fe_{tot}$ | $Fe^{2+}$ | $Fe^{3+}$ |
| 0 | 105 | 0.01 | 25.46 | 5.24 | 1.59 | 6.90 | 0.71 | 0.12 | 40.08 | 10 | 30.8 |
| 20 | 105 | 0.47 | 23.50 | 4.09 | 1.81 | 13.30 | 0.83 | 0.22 | 38.1 | 16.5 | 21.6 |
| 40 | 105 | 0.42 | 23.36 | 5.01 | 2.10 | 13.40 | 0.76 | 0.2 | 38.6 | 13 | 25.6 |
| 60 | 105 | 0.31 | 23.22 | 5.39 | 2.23 | 13.80 | 0.75 | 0.22 | 37.9 | 15.8 | 22.1 |
| 80 | 105 | 0.11 | 22.80 | 5.99 | 2.82 | 10.50 | 0.86 | 0.16 | 38.5 | 14 | 24.5 |
| 100 | 105 | 0.2 | 22.66 | 5.58 | 2.82 | 14.40 | 0.66 | 0.19 | 37.9 | 15.5 | 22.4 |
| 120 | 103 | 0.24 | 22.38 | 5.65 | 2.93 | 14.50 | 0.65 | 0.17 | 37.1 | 14.4 | 22.7 |
| 140 | 103 | 0.04 | 21.96 | 5.90 | 3.27 | 16.00 | 0.65 | 0.15 | 36.3 | 16.7 | 19.6 |
| 160 | 103 | 0.09 | 21.96 | 5.82 | 3.36 | 15.60 | 0.61 | 0.16 | 37.1 | 15.1 | 22 |
| 180 | 103 | 0.09 | 19.59 | 6.18 | 3.01 | 11.60 | 0.71 | 0.13 | 37.1 | 15.3 | 21.8 |
| 200 | 103 | 0.07 | 21.96 | 5.82 | 3.35 | 15.40 | 0.66 | 0.17 | 36 | 12.7 | 23.3 |
| 220 | 100 | 0.02 | 21.12 | 5.93 | 3.25 | 18.20 | 0.66 | 0.17 | 35.6 | 18.3 | 17.3 |
| 240 | 100 | 0.06 | 20.57 | 5.73 | 3.29 | 14.30 | 0.80 | 0.15 | 36.4 | 15.9 | 20.5 |
| 260 | 0 | 0.05 | 21.40 | 5.93 | 3.36 | 17.70 | 0.70 | 0.15 | 35.7 | 17.4 | 18.3 |
| 280 | 0 | 0.03 | 21.40 | 5.15 | 3.33 | 17.60 | 0.75 | 0.15 | 36.5 | 15.7 | 20.8 |

It can be seen that the final slag contained 18% copper and there was <0.05% S in the blister copper. This is close to equilibrium concentrations. The copper balance was as follows:

copper metal initially: 330.5 g;

copper in concentrate: 284 g;

copper in final slag: 110 g;

Final copper: 505 g;

Copper partition: 82% to metal

The slag composition during converting was $Al_2O_3$ 2–4%, MgO 0.6–0.8%, Fe 36–38%, $Fe^{3+}/Fe_{tot}$ (corr) 0.95, CaO/Fe 0.6 and S <0.2%.

Test 4

In this test, the blowing depth was 3–4 cm into the blister copper, the oxygen stoichiometry was 105–100% and the CaO content of the slag was 21–23%. Metal and slag analyses throughout the process are shown in the following table:

| Time | % Oxy | S in | Slag Analysis Wt % | | | | | | | | |
|---|---|---|---|---|---|---|---|---|---|---|---|
| min | stoich. | Cu | CaO | $SiO_2$ | $Al_2O_3$ | Cu | MgO | S | $Fe_{tot}$ | $Fe^{2+}$ | $Fe^{3+}$ |
| 0 | 105 | 0.01 | 22.94 | 3.91 | 2.10 | 15.50 | 0.78 | 0.13 | 38.80 | 14.60 | 24.20 |
| 20 | 105 | 0.06 | 22.24 | 3.64 | 2.12 | 17.00 | 0.60 | 0.42 | 38.80 | 18.10 | 20.70 |
| 40 | 105 | 0.08 | 23.64 | 3.96 | 2.55 | 14.70 | 0.76 | 0.24 | 39.00 | 14.80 | 24.20 |
| 60 | 105 | 0.04 | 22.94 | 3.81 | 2.61 | 15.90 | 0.61 | 0.20 | 39.30 | 16.20 | 23.10 |
| 80 | 105 | 0.02 | 22.38 | 3.72 | 2.72 | 17.80 | 0.55 | 0.18 | 37.40 | 17.40 | 20.00 |
| 100 | 103 | 0.02 | 21.96 | 4.19 | 3.12 | 18.70 | 0.85 | 0.14 | 35.20 | 16.60 | 18.60 |
| 120 | 103 | 0.02 | 21.40 | 4.13 | 3.21 | 19.30 | 0.85 | 0.14 | 35.60 | 17.90 | 17.70 |
| 140 | 103 | 0.06 | 21.40 | 4.09 | 3.36 | 18.90 | 0.83 | 0.14 | 35.30 | 16.00 | 19.30 |
| 160 | 100 | 0.03 | 21.40 | 4.30 | 3.44 | 18.60 | 0.78 | 0.14 | 35.00 | 17.70 | 17.30 |
| 180 | 100 | 0.05 | 20.99 | 4.43 | 4.06 | 18.30 | 1.62 | 0.15 | 35.00 | 18.40 | 16.60 |
| 200 | 100 | 0.03 | 20.85 | 2.35 | 4.33 | 19.00 | 1.61 | 0.14 | 35.00 | 14.80 | 20.20 |
| 220 | 100 | 0.03 | 21.26 | 4.68 | 5.10 | 18.40 | 1.62 | 0.15 | 35.30 | 16.00 | 19.30 |
| 240 | 100 | 0.03 | 21.26 | 4.53 | 5.54 | 17.70 | 1.56 | 0.16 | 34.30 | 15.70 | 18.60 |
| 260 | 0 | 0.04 | 21.12 | 4.45 | 5.61 | 18.00 | 1.59 | 0.14 | 34.00 | 14.90 | 19.10 |
| 280 | 0 | 0.03 | 21.26 | 4.47 | 5.75 | 17.40 | 1.62 | 0.14 | 33.80 | 15.20 | 18.60 |

Steady state was achieved after about 100 minutes. It can be seen that the final slag contained 19% copper and there was <0.05% S in the blister copper. This is close to equilibrium concentrations. The copper balance was as follows:

copper metal initially: 330.5 g;

Copper in initial slag: 33.8 g;

Copper in concentrate: 284 g;

Copper in final slag: 144 g;

Final copper: 504 g;

Copper partition: 78% to metal

The slag composition during converting was $Al_2O_3$ 3–6%, MgO 1–2%, Fe 34–36%t, $Fe^{3+}/Fe_{tot}$ (corr) 1.00, CaO/Fe 0.6 and S<0.16%.

Test 5

In this test, the blowing depth was 3–4 cm into the blister copper, the oxygen stoichiometry was 103–105% and the CaO content of the slag was 17–21%. Metal and slag analyses throughout the process are in the following table:

| Time | % Oxy | S in | Slag Analysis Wt % | | | | | | | | |
|---|---|---|---|---|---|---|---|---|---|---|---|
| min | Stoich. | Cu | CaO | $SiO_2$ | $Al_2O_3$ | Cu | MgO | S | $Fe_{tot}$ | $Fe^{2+}$ | $Fe^{3+}$ |
| 0 | 103 | 0.02 | 18.89 | 3.89 | 1.46 | 21.30 | 0.51 | 0.14 | 36.9 | 19.2 | 17.7 |
| 20 | 103 | 0.04 | 17.07 | 3.19 | 1.32 | 26.10 | 0.17 | 0.34 | 38.7 | 25.5 | 13.2 |
| 40 | 103 | 0.03 | 18.33 | 3.81 | 1.61 | 21.70 | 0.20 | 0.38 | 36.2 | 22.7 | 13.5 |
| 60 | 103 | 0.03 | 19.03 | 4.53 | 2.12 | 18.40 | 0.80 | 0.16 | 39.5 | 19.6 | 19.9 |
| 80 | 103 | 0.02 | 19.31 | 4.56 | 2.40 | 18.20 | 0.65 | 0.17 | 39.2 | 18.7 | 20.5 |
| 100 | 103 | 0.01 | 18.89 | 4.60 | 2.51 | 18.90 | 0.55 | 0.14 | 37.2 | 18.4 | 18.8 |
| 120 | 103 | 0.02 | 18.61 | 4.60 | 2.59 | 19.30 | 0.53 | 0.14 | 37.9 | 18.4 | 19.5 |
| 140 | 103 | 0.01 | 18.33 | 4.53 | 2.65 | 20.10 | 0.50 | 0.14 | 38.4 | 19.7 | 18.7 |
| 160 | 95 | 0.03 | 19.17 | 4.77 | 2.95 | 17.60 | 0.48 | 0.14 | 38.2 | 16.9 | 21.3 |
| 180 | 95 | 0.04 | 19.59 | 4.88 | 3.16 | 16.30 | 0.46 | 0.16 | 37.4 | 17.8 | 19.6 |
| 200 | 95 | 0.08 | 20.29 | 5.01 | 3.35 | 14.30 | 0.48 | 0.18 | 40.9 | 17.4 | 23.5 |
| 220 | 95 | 0.09 | 20.71 | 5.09 | 3.76 | 12.90 | 0.50 | 0.16 | 39.9 | 14 | 25.9 |
| 240 | 95 | 0.07 | 20.43 | 5.09 | 4.18 | 13.50 | 0.43 | 0.16 | 41.4 | 14.9 | 26.5 |
| 260 | 0 | 0.08 | 20.71 | 5.24 | 4.25 | 13.60 | 0.38 | 0.16 | 39.6 | 15.1 | 24.5 |
| 280 | 0 | 0.08 | 21.12 | 5.22 | 4.31 | 13.50 | 0.30 | 0.16 | 40.5 | 12.5 | 28 |

A steady state was achieved after about 60 minutes. It can be seen that after 60 minutes the slag contained 20% copper and there was <0.05% S in the blister copper. Decreasing the oxygen stoichiometry to 95% caused the blister copper sulphur content to increase to 0.1 wt % and the copper content of the slag to decrease to 13 wt %. This is close to equilibrium concentrations. The copper balance was as follows:

Copper metal initially: 332.7 g;

Copper in initial slag: 33.8 g;

Copper in concentrate: 284 g;

Copper in final slag: 91.3;

Final copper: 520 g;

Copper partition: 80% to metal

The slag composition during converting was $Al_2O_3$ 2.0–4.5%, MgO 0.2–0.7%, Fe 37–39%, $Fe^{3+}/Fe_{tot}$ (corr) 0.93, CaO/Fe 0.5 and S<0.2%.

Test 6

In this test, the blowing depth was 1–2 cm into the slag, the oxygen stoichiometry was 105% and the CaO content of the slag was 21–24%. Metal and slag analyses throughout the process are shown in the following table:

| Time | % Oxy | S in | Slag Analysis Wt % | | | | | | | | |
|---|---|---|---|---|---|---|---|---|---|---|---|
| min | Stoich. | Cu | CaO | $SiO_2$ | $Al_2O_3$ | Cu | MgO | S | $Fe_{tot}$ | $Fe^{2+}$ | $Fe^{3+}$ |
| 0 | 105 | 0.001 | 21.36 | 3.59 | 2.17 | 17.04 | 1.53 | 0.07 | 36.2 | 15.7 | 20.5 |
| 20 | 105 | 0.83 | 22.58 | 4.09 | 2.38 | 10.26 | 1.31 | 0.3 | 38.6 | 13.3 | 25.3 |
| 40 | 105 | 1.26 | 23.88 | 4.26 | 2.82 | 10.46 | 1.19 | 0.3 | 41.5 | 11.5 | 30 |
| 60 | 105 | 0.99 | 24.15 | 4.26 | 3.10 | 10.44 | 1.08 | 0.3 | 41.6 | 12.8 | 28.8 |
| 80 | 105 | 1.25 | 19.82 | 4.21 | 2.65 | 8.96 | 0.83 | 0.2 | 40.1 | 12.2 | 27.9 |
| 100 | 105 | 1.17 | 24.19 | 4.45 | 3.25 | 7.80 | 0.96 | 0.2 | 40.4 | 8.3 | 32.1 |
| 120 | 105 | 1.4 | 23.64 | 4.53 | 3.23 | 7.37 | 0.85 | 0.2 | 41.3 | 7.2 | 34.1 |
| 140 | 105 | 1.3 | 23.35 | 4.41 | 3.27 | 8.63 | 0.86 | 0.2 | 40.2 | 8.5 | 31.7 |
| 160 | 105 | 1.3 | 23.59 | 4.38 | 3.16 | 7.74 | 0.50 | 0.2 | 41.8 | 7.2 | 34.6 |
| 180 | 105 | 1.3 | 24.38 | 4.36 | 3.18 | 8.42 | 0.78 | 0.4 | 40.8 | 10.9 | 29.9 |
| 200 | 105 | 1.3 | 23.66 | 3.83 | 3.19 | 8.27 | 0.75 | 0.3 | 41.7 | 11.4 | 30.3 |
| 220 | 0 | 1.3 | 21.19 | 4.38 | 2.80 | 6.83 | 0.5S | 0.3 | 40.5 | 8.1 | 32.4 |
| 240 | 0 | 1.1 | 24.19 | 4.24 | 3.33 | 7.77 | 0.73 | 0.3 | 41.3 | 9.6 | 31.7 |

The sulphur blister value reached a steady state of 1.3% indicating that a matte had formed. The copper content of the slag was 9%. This value is above equilibrium concentrations. The copper balance was as follows:

Copper metal initially: 330 g;

Copper in initial slag: 33.8 g;

Copper in concentrate: 237 g;

Copper in final slag: 46 g;

Final copper: 555 g;

Copper partition: 92% to metal

The slag composition during converting was $Al_2O_3$ 2–4%, MgO 0.6–1.2%, Fe 40%, $Fe^{3+}/Fe_{tot}$ (corr) 0.99, CaO/Fe 0.6 and S<0.4%.

Test 7

In this test, the blowing depth was 1–2 cm into the slag, the oxygen stoichiometry was 110% and the CaO content of the slag was 21–24%. Metal and slag analyses throughout the process are shown in the following table:

| Time min | % Oxy Stoich. | S in Cu | Slag Analysis Wt % | | | | | | | | |
|---|---|---|---|---|---|---|---|---|---|---|---|
| | | | CaO | $SiO_2$ | $Al_2O_3$ | Cu | MgO | S | $Fe_{tot}$ | $Fe^{2+}$ | $Fe^{3+}$ |
| 0   | 110 | 0    | 20.75 | 3.49 | 1.91 | 18.10 | 1.45 | 0.08 | 36.9  | 15.6 | 21.3  |
| 20  | 110 | 0.31 | 19.43 | 4.04 | 2.12 | 11.56 | 1.17 | 0.20 | 37.6  | 11.5 | 26.1  |
| 40  | 110 | 0.25 | 21.82 | 4.09 | 2.76 | 13.28 | 1.10 | 0.21 | 37.9  | 14.1 | 23.8  |
| 60  | 110 | 0.2  | 22.37 | 4.19 | 2.99 | 13.96 | 1.04 | 0.23 | 37.4  | 13.3 | 24.1  |
| 80  | 113 | 0.71 | 23.69 | 4.32 | 3.21 | 12.12 | 1.04 | 2.70 | 38.78 | 22.7 | 16.08 |
| 100 | 113 | 0.32 | 21.52 | 4.34 | 3.04 | 12.78 | 0.88 | 0.20 | 37.5  | 11.3 | 26.2  |
| 120 | 113 | 0.13 | 20.64 | 4.24 | 3.01 | 14.41 | 0.93 | 0.18 | 38.4  | 11.3 | 27.1  |
| 140 | 113 | 0.12 | 20.61 | 3.85 | 3.04 | 14.88 | 0.96 | 0.18 | 36.5  | 12.7 | 23.8  |
| 160 | 116 | 0.08 | 20.27 | 4.34 | 2.97 | 13.69 | 0.93 | 0.16 | 36.6  | 12.7 | 23.9  |
| 180 | 116 | 0.12 | 20.85 | 4.17 | 3.08 | 15.62 | 0.96 | 0.17 | 35.8  | 12.9 | 22.9  |
| 200 | 116 | 0.08 | 20.38 | 4.00 | 3.04 | 17.08 | 0.98 | 0.13 | 35.2  | 11.4 | 23.8  |
| 220 | 0   | 0.04 | 17.57 | 4.15 | 2.61 | 15.03 | 0.87 | 0.08 | 35.7  | 14.1 | 21.6  |
| 240 | 0   | 0.05 | 20.22 | 4.09 | 3.04 | 17.25 | 1.02 | 0.10 | 35.5  | 12.3 | 23.2  |

The sulphur blister value reached a steady state of about 0.08%. The copper content of the slag was 15%. This was close to chemical equilibrium concentrations. The copper balance was as follows:

Copper metal initially: 330.5 g;
Copper in initial slag: 33.8 g;
Copper in concentrate: 237 g;
Copper in final slag: 113;
Final copper: 488 g;
Copper partition: 81% to metal The slag composition during converting was $Al_2O_3$ 2–4%, MgO 1.0%, Fe 34–38.5%, $Fe^{3+}/Fe_{tot}$ (corr) 1.00, CaO/Fe 0.6 and S<0.2%.

The oxygen utilization for all the tests was greater than 95% and the magnesia content of the slag was less than 2%. The alumina content of the bath increased in each test due to erosion of the lance, but remained below 6%. A high concentration of nickel occurred in Test 1 due to the stainless steel lance used in the early part of the test. From an analysis of the results, it can be seen that changes in temperature did not affect the copper content of the slag nor the sulphur content of the blister. The effect of lance immersion depth on the oxidation state of the blister and slag phases can be determined by comparing the results of Test 2 with Tests 6 and 7. At an oxygen stoichiometry of 105% (Tests 2 and 6), shallow air injection resulted in a slightly more oxidized slag (higher $Fe^{3+}/Fe_{tot}$) and a higher sulphur content of blister and lower copper content in the slag. This suggests that oxygen is accumulating in the slag, but is not being transferred efficiently to the blister phase to liberate sulphur. Although in test 7 the sulphur content was lower at about 0.08% and the amount of copper in the slag closer to equilibrium concentration, it was necessary to use a higher oxygen stoichiometry 116% at a flow rate of 7 l/min. This corresponds to about 22% higher than the air flow required when using a deeper lance to obtain the same sulphur content in blister (5.7 l/min in Test 5).

EXAMPLE 4

A comparison of the sulphur levels in product copper with the Mitsubishi process and the present process was conducted. An experiment was conducted in a 250 kg scale furnace. The copper matte used contained 47.59 wt % Cu, 23.89 wt % Fe, 23.46 wt % S, 0.21 wt % $SiO_2$, 0.05 wt % MgO, 0.10 wt % As, 0.12 wt % Co and 7.93 wt % $Fe_3O_4$. Limestone flux used contained 0.40 wt % Cu, 0.84 wt % Fe, 50.29 wt % CaO, 0.01 wt % S, 4.01 wt % $SiO_2$, 0.74 wt % $Al_2O_3$, 0.51 wt % MgO, 0.05 wt % As and 0.19 wt % $Fe_3O_4$. Concentrate when used was copper concentrate produced using conventional milling and flotation technology and contained 26.05 wt % Cu, 28.12 wt % Fe, 0.30 wt % CaO, 30.30 wt % S, 7.28 wt % $SiO_2$, 0.53 wt % $Al_2O_3$, 0.74 wt % MgO, 0.21 wt % As, 0.14 wt % Co and 0.48 wt % $Fe_3O_4$. Spiked concentrate when used was copper concentrate that had been mixed with converter slag concentrate and contained 30.03 wt % Cu, 23.43 wt % Fe, 0.40 wt % CaO, 25.37 wt % S, 10.27 wt % $SiO_2$, 0.62 wt % $Al_2O_3$, 0.96 wt % MgO, 0.20 wt % As, 0.12 wt % Co and 1.39 wt % $Fe_3O_4$. Silica flux when used contained 0.03 wt % Cu, 1.22 wt % Fe, 0.37 wt % CaO, 96.17 wt % $SiO_2$, 0.27 wt % $Al_2O_3$ and 0.78 wt % $Fe_3O_4$. 22 tests were conducted with oxidizing gas injected by means of a lance such that a substantial portion of the gas contacts the blister copper phase. Test conditions for each test and assays of the slags and blister copper for each test run are listed in the following tables:

Test Conditions for 250 kg Scale Continuous Copper Converting Testwork.

| | Feed Rate | | | | | | | Target composition ratios | | | Copper | Blister | |
|---|---|---|---|---|---|---|---|---|---|---|---|---|---|
| | Copper | Limestone | | Oxygen | | Oil | | | in the product slag | | Matte | Copper | Slag |
| Run No. | Matte Kg/h | Flux Kg/h | Air Flow $Nm^3/h$ | Flow $Nm^3/h$ | Flow l/h | Temp. Deg. C. | Stoic* % | CaO/Fe | Fe3+/ Fe2+ | Cu2O/ Fe | Feed Total Kg | Produced Kg | Produced Kg |
| Run 1 | 200 | 31.5 | 232 | 19.5 | 8.3 | 1220 | 132 | 0.34 | 1.23 | 0.34 | 200 | 46.1 | 19.0 |
| Run 2 | 200 | 31.5 | 60  | 33.5 | 0   | 1210 | 117 | 0.34 | 1.23 | 0.34 | 250 | 101.3 | 149.0 |
| Run 3 | 200 | 31.5 | 115 | 25   | 0   | 1220 | 125 | 0.34 | 1.23 | 0.34 | 200 | 44.1 | 157.0 |
| Run 4 | 200 | 13.9 | 135 | 15   | 0   | 1230 | 110 | 0.20 | 1.23 | 0.34 | 250 | — | — |

-continued

Test Conditions for 250 kg Scale Continuous Copper Converting Testwork.

| | Feed Rate | | | Oxygen | Oil | | | Target composition ratios in the product slag | | | Copper Matte | Blister Copper | Slag |
|---|---|---|---|---|---|---|---|---|---|---|---|---|---|
| Run No. | Copper Matte Kg/h | Limestone Flux Kg/h | Air Flow Nm³/h | Flow Nm³/h | Flow l/h | Temp. Deg. C. | Stoic* % | CaO/Fe | Fe3+/ Fe2+ | Cu2O/ Fe | Feed Total Kg | Produced Kg | Produced Kg |
| Run 5 | 200 | 17.3 | 155 | 21 | 0 | 1270 | 136 | 0.24 | 1.23 | 0.34 | 250 | 95.5 | 81.1 |
| Run 6 | 200 | 24.0 | 150 | 20 | 0 | 1220 | 131 | 0.34 | 1.23 | 0.34 | 250 | 83.0 | 91.5 |
| Run 7 | 200 | 19.8 | 120 | 25 | 0 | 1185 | 127 | 0.17 | 1.23 | 0.34 | 250 | 0.0 | 263.5 |
| Run 8 | 200 | 19.8 | 120 | 25 | 0 | 1240 | 127 | 0.17 | 1.23 | 0.34 | 200 | 0.0 | 209.1 |
| Run 9 | 200 | 19.8 | 120 | 20 | 0 | 1190 | 115 | 0.17 | 1.23 | 0.34 | 150 | 33.0 | 65.0 |
| Run 10 | 200 | 19.8 | 105 | 20 | 0 | 1205 | 107 | 0.17 | 1.23 | 0.34 | 300 | 49.0 | — |
| Run 12 | 200 | 19.8 | 100 | 25 | 0 | 1210 | 117 | 0.17 | 1.23 | 0.34 | 400 | 37.5 | 100.0 |
| Run 13 | 200 | 39.6 | 75 | 30 | 0 | 1200 | 116 | 0.34 | 1.23 | 0.34 | 280 | 74.5 | 144.0 |
| Run 14 | 100 | 0.0 | 115 | 7 | 0 | 1260 | 158 | 0.00 | 0.90 | 0.34 | 200 | 0.2 | 146.0 |

*Stoichiometry: Ratio of actual oxygen injected into the slag to the stoichiometric quantity to oxidize the iron to FeO and the sulphur to $SO_2$ adjusted for the presence of magnetite and oil Test Conditions for 250 kg Scale Direct Copper Testwork

| | Feed Rate | | | Oxidation | | | | | | Reduction | | | | Copper | | | |
|---|---|---|---|---|---|---|---|---|---|---|---|---|---|---|---|---|---|
| Run No. | Copper Con Kg/h | Limestone Flux Kg/h | Silica Flux Kg/h | Air Flow Nm³/h | Oxygen Flow Nm³/h | Oil Flow l/h | Temp. Deg. C. | Stoic* % | Target CaO/Fe | Air Flow Nm³/h | Coal Kg/h | Oil Flow l/h | Temp. Deg. C. | Con Feed Total Kg | Blister Copper Produced Kg | Slag Produced Kg | Carry-over Kg |
| Run 15** | 100 | 28.3 | 0 | 98 | 25 | 10 | 1230 | 117 | 0.53 | — | — | — | — | 200 | 0.0 | 169.5 | 9.9 |
| Run 16** | 100 | 47.3 | 0 | 95 | 25 | 10 | 1220 | 114 | 0.53 | 65 | 15 | 7.5 | 1250 | 150 | 29.2 | 69.4 | 13.8 |
| Run 17 | 150 | 47.3 | 0 | 120 | 25 | 5 | 1205 | 101 | 0.50 | 66 | 15 | 6.8 | 1240 | 150 | 31.1 | 48.0 | 13.4 |
| Run 18 | 150 | 47.3 | 0 | 113 | 23 | 5 | 1230 | 97 | 0.50 | — | — | — | — | 200 | 8.5 | 122.0 | 7.2 |
| Run 19 | 150 | 47.3 | 0 | 102 | 25 | 5 | 1250 | 91 | 0.50 | 105 | 20 | 12 | 1250 | 200 | 44.0 | 33.0 | 7.9 |
| Run 21 | 150 | 0.0 | 5.8 | 98 | 22 | 0 | 1250 | 106 | N/A | 123 | 10 | 10 | 1235 | 150 | 0.7 | 79.4 | 4.4 |
| Run 22a | 150 | 47.3 | 0 | 108 | 33 | 9 | 1190 | 95 | 0.50 | — | — | — | — | 150 | 0.0 | 80.6 | 7 |
| Run 22b | 150 | 47.3 | 0 | 115 | 30 | 7.5 | 1200 | 98 | 0.50 | — | — | — | — | 170 | 0.0 | 22.1 | 3.9 |

*Stoichiometry: Ration of actual oxygen injected into the slag to the stoichiometric quantity to oxidize the iron to FeO and the sulphur to $SO_2$ adjusted for the presence of magnetite and oil.
**Concentrate spiked with slag concentrate was used for this test.

Assay of Slags for each Test Run for 250 kg Scale Testwork.

| Run No. | Process | Cu % | Fe % | CaO % | S % | SiO₂ % | Al2O3 % | MgO % | As % | Co % | Fe3O4 % | CaO/Fe |
|---|---|---|---|---|---|---|---|---|---|---|---|---|
| Run 1 | Continuous Convert | 24.48 | 38.69 | 13.06 | 0.04 | 1.52 | 0.77 | 0.41 | 0.07 | 0.18 | 26.64 | 0.34 |
| Run 2 | Continuous Convert | 24.87 | 39.70 | 13.17 | 0.04 | 1.41 | 0.54 | 0.38 | 0.10 | 0.21 | 24.69 | 0.33 |
| Run 3 | Continuous Convert | 26.27 | 38.79 | 11.47 | 0.05 | 1.28 | 0.37 | 0.44 | 0.06 | 0.18 | 28.25 | 0.20 |
| Run 4 | Continuous Convert | 17.85 | 47.60 | 9.89 | 1.31 | 1.13 | 0.26 | 0.15 | 0.02 | 0.14 | 58.91 | 0.21 |
| Run 5 | Continuous Convert | 14.18 | 51.57 | 9.80 | 0.48 | 1.25 | 0.26 | 0.10 | 0.03 | 0.19 | 70.21 | 0.19 |
| Run 6 | Continuous Convert | 19.11 | 46.86 | 10.47 | 0.22 | 1.28 | 0.32 | 0.18 | 0.06 | 0.26 | 54.65 | 0.12 |
| Run 7 | Continuous Convert | 37.03 | 34.09 | 6.58 | 0.08 | 1.02 | 0.18 | 0.15 | 0.07 | 0.15 | 9.95 | 0.19 |
| Run 8 | Continuous Convert | 46.95 | 26.04 | 5.54 | 0.04 | 0.82 | 0.29 | 0.40 | 0.07 | 0.14 | 8.39 | 0.21 |
| Run 9 | Continuous Convert | 35.30 | 36.03 | 7.03 | 0.06 | 1.06 | 0.19 | 0.31 | 0.09 | 0.21 | 25.16 | 0.20 |
| Run 10 | Continuous Convert | 21.10 | 39.36 | 11.67 | 0.99 | 4.77 | 0.46 | 0.36 | 0.07 | 0.16 | 39.05 | 0.30 |
| Run 12 | Continuous Convert | 33.84 | 37.43 | 5.78 | 0.09 | 0.87 | 0.19 | 0.34 | 0.06 | 0.24 | 31.67 | 0.15 |
| Run 13 | Continuous Convert | 27.65 | 38.05 | 11.33 | 0.19 | 1.39 | 0.31 | 0.36 | 0.10 | 0.24 | 26.65 | 0.30 |
| Run 14 | Continuous Convert | 41.80 | 32.72 | 2.36 | 0.02 | 0.45 | 0.17 | 0.52 | 0.04 | 0.21 | 26.20 | 0.07 |
| Run 15 | Direct Copper | 27.39 | 35.28 | 9.23 | 0.01 | 5.05 | 0.50 | 0.51 | 0.08 | 0.12 | 22.66 | 0.26 |
| Run 16 | Direct Copper | 22.62 | 36.41 | 10.81 | 0.01 | 6.84 | 0.65 | 0.56 | 0.09 | 0.10 | 31.75 | 0.30 |
| | reduction | 3.01 | 47.07 | 17.82 | — | 11.95 | 1.16 | 0.63 | 0.03 | 0.10 | 38.42 | 0.38 |
| Run 17 | Direct Copper - | 23.04 | 36.35 | 11.53 | 0.01 | 6.86 | 0.78 | 1.07 | 0.08 | 0.13 | 35.03 | 0.32 |
| | reduction | 1.42 | 45.55 | 22.07 | — | 12.56 | 1.50 | 1.22 | 0.01 | 0.15 | 5.57 | 0.48 |

Assay of Slags for each Test Run for 250 kg Scale Testwork.

| Run No. | Process | Cu % | Fe % | CaO % | S % | SiO$_2$ % | Al2O3 % | MgO % | As % | Co % | Fe3O4 % | CaO/Fe |
|---|---|---|---|---|---|---|---|---|---|---|---|---|
| Run 18 | Direct Copper | 22.85 | 35.01 | 15.32 | 0.11 | 8.13 | 0.91 | 1.22 | 0.11 | 0.18 | 47.54 | 0.44 |
| Run 19 | Direct Copper - | 9.75 | 39.18 | 21.14 | 0.05 | 11.56 | 1.26 | 1.24 | 0.07 | 0.17 | 35.26 | 0.54 |
|  | reduction | 3.74 | 42.38 | 23.12 | — | 12.86 | 1.56 | 1.32 | 0.01 | 0.11 | 4.57 | 0.55 |
| Run 21 | Direct Copper - | 20.61 | 38.38 | 5.02 | 0.12 | 14.48 | 0.89 | 1.03 | 0.07 | 0.17 | 47.71 | 0.13 |
|  | reduction | 23.28 | 37.68 | 3.73 | — | 12.78 | 0.89 | 1.04 | 0.06 | 0.17 | 44.78 | 0.10 |
| Run 22A | Direct Copper | 19.64 | 34.95 | 14.06 | 0.04 | 8.40 | 0.91 | 1.31 | 0.12 | 0.18 | 33.27 | 0.41 |
| Run 22B | Direct Copper | 23.41 | 31.95 | 15.11 | 0.11 | 8.16 | 0.91 | 1.44 | 0.14 | 0.17 | 28.96 | 0.48 |

Assay of Copper Produced including Minor Elements for 250 kg Scale of Testwork.

| Run No. | Process | Au ppm | Zn ppm | Pb ppm | Sn ppm | P ppm | Fe ppm | Ni ppm | Te ppm | As ppm | Se ppm | Sb ppm | Cd ppm | Bi ppm | Ag ppm | Co ppm | S ppm |
|---|---|---|---|---|---|---|---|---|---|---|---|---|---|---|---|---|---|
| Run 2 | Continuous Convert | 15 | 8 | 350 | <5 | <5 | 29 | 64 | 22 | 278 | 18 | 24 | <2 | 142 | 163 | 6 | 1030 |
| Run 3 | Continuous Convert | 65 | 32 | 275 | <5 | <5 | 370 | 40 | 65 | 80 | 26 | 24 | <2 | 92 | 312 | 6 | 440 |
| Run 5 | Continuous Convert | 19 | 55 | >1500 | 40 | 7 | 45 | 144 | 21 | 1170 | 15 | 360 | <2 | 222 | 194 | 24 | 5200 |
| Run 6 | Continuous Convert | 5 | 17 | 246 | 7 | <5 | 116 | 56 | 15 | 608 | 12 | 33 | <2 | 126 | 158 | 12 | 520 |
| Run 9 | Continuous Convert | 3 | 5 | 30 | 33 | <5 | 46 | 21 | <3 | 96 | 2 | <3 | <2 | 30 | 120 | 4 | 110 |
| Run 10 | Continuous Convert | 5 | 15 | 540 | 13 | <5 | 204 | 66 | <3 | 911 | 8 | 53 | <2 | 138 | 125 | 11 | 4100 |
| Run 12 | Continuous Convert | 3 | 19 | 62 | 10 | <5 | 144 | 35 | 16 | 167 | 6 | 13 | 3 | 53 | 201 | 11 | 120 |
| Run 13 | Continuous Convert | 4 | 11 | 173 | 6 | 146 | 50 | 41 | 8 | 143 | 15 | 12 | <2 | 103 | 178 | 8 | 385 |
| Run 14 | Continuous Convert | >150 | 1160 | <5 | >1200 | <5 | 880 | 320 | 420 | 1700 | 143 | 560 | >150 | >300 | 296 | 178 | >5000 |
| Run 16 | Direct Copper | 9 | 22 | 860 | 50 | <5 | 304 | 154 | 22 | 1570 | 1 | 234 | <2 | 108 | 225 | 7 | — |
| Run 17 | Direct Copper | 3 | 404 | >1500 | 125 | <5 | >1050 | 448 | 4 | >3000 | 3 | 300 | <2 | 98 | 148 | 366 | 310 |
| Run 18 | Direct Copper | 5 | 9 | 71 | 5 | <5 | 55 | 26 | <3 | 95 | 7 | 7 | <2 | 25 | 283 | 5 | 130 |
| Run 19 | Direct Copper | 8 | 1023 | >1500 | 115 | <5 | >1050 | 433 | 19 | >3000 | 8 | 172 | <2 | 89 | 162 | >1500 | 381 |
| Run 21 | Direct Copper | <2 | 11 | 140 | 20 | <5 | 41 | 67 | 8 | 2000 | 2 | 137 | <2 | 140 | 238 | 4 | 110 |

The 250 kg furnace had been used for smelting lead bearing drosses which will account for some of the impurities in the copper product.

Figure 16:
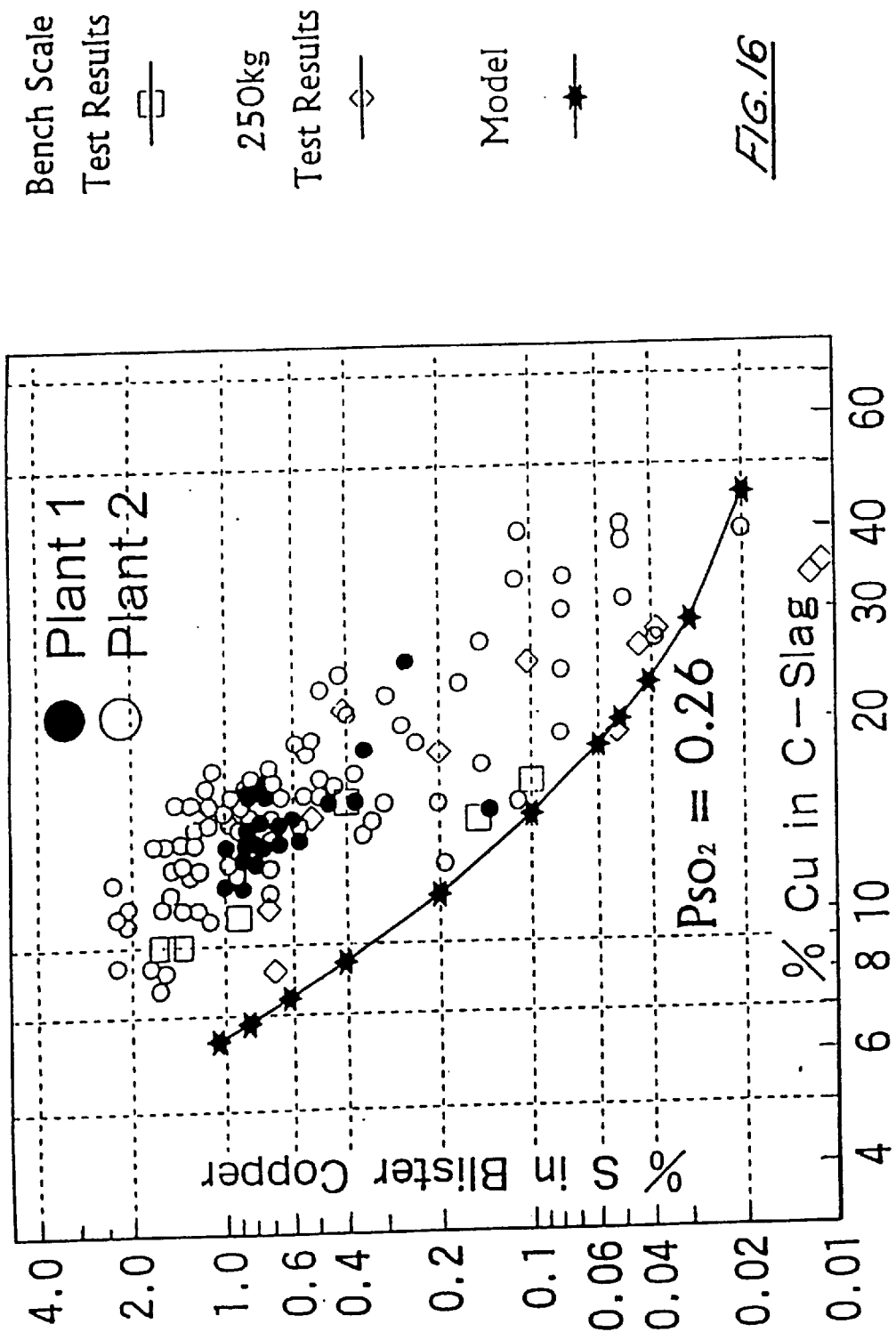
FIG. 16 is a graph of the relationship between copper in slag and sulphur in blister and showing the results of Tests of Example 4 carried out in accordance with the present invention in Example 4 compared with published data from two Mitsubishi converting processes.

The relationship between the copper content of the slag and the sulphur content of copper for each test is shown in FIG. 16. Also included are the results from the bench work and published data from commercial Mitsubishi Continuous Converting Furnaces.

It can be seen from FIG. 16 that the higher the copper content of the slag, the lower the sulphur content of the blister. The sulphur contents for the blister copper prepared by the method of the present invention are generally lower than published data for other lance based Continuous Converting Processes for any given percentage copper in the slag and especially at low sulphur contents.

The invention is useful for converting copper sulphide mattes and concentrates.

Although the invention has been described with reference to specific examples, it will be appreciated that the invention can be embodied in many other forms.

We claim:

1. A process for converting a copper sulphide matte and/or a copper sulphide concentrate to blister copper comprising the steps of:

adding the matte and/or concentrate together with a suitable flux to an agitated continuous molten slag phase into which the matte and/or concentrate is dispersed, and with which the matte and/or concentrate reacts, the continuous slag phase floating on a continuous molten blister copper phase, an interface being located between the continuous slag phase and the continuous blister copper phase;

injecting by means of submerged lance an oxidizing gas capable of reacting with the continuous slag phase and continuous blister copper phase, the continuous slag phase in turn reacting with the matte or concentrate to form a blister copper containing a low sulphur content, slag and sulphur dioxide, said oxidizing gas agitating said continuous slag phase and said continuous blister copper phase;

the lance tip being located deep within the continuous slag phase, the depth of the lance tip being adjusted relative to the slag/blister copper interface so as to minimize the percentage of sulphur in the blister copper at a target copper-in-slag concentration and at a depth adjacent to said interface so as to ensure that a substantial portion of the gas contacts the continuous blister copper phase, said percentage of sulphur in said blister copper being less than 0.1 wt % sulphur; and separating blister copper from the continuous slag phase.

2. A process for converting a copper sulphide matte and/or a copper sulphide concentrate to blister copper comprising the steps of:

adding the matte and/or concentrate together with a suitable flux to an agitated continuous molten slag phase into which the matte and/or concentrate is dispersed, and with which the matte and/or concentrate reacts, the continuous slag phase floating on a continuous molten blister copper phase, an interface being located between the continuous slag phase and the continuous blister copper phase;

injecting by means of a submerged lance an oxidizing gas capable of reacting with the matte or concentrate to form a blister copper containing a low sulphur content, slag and sulphur dioxide, said oxidizing gas agitating said continuous slag phase and said continuous blister copper phase;

the lance tip being located deep within the continuous slag phase at a depth selected in relation to said slag/blister copper interface so as to ensure that a substantial portion of the gas contacts the blister copper phase; and separating blister copper from the continuous slag phase.

3. A process according to claim 2 wherein the position of the lance tip within the continuous slag phase is adjusted so that the tip is located adjacent to said slag/blister copper interface.

4. A process according to claim 3 wherein the bath has depth to diameter ratio on average greater than 0.2.

5. A process for converting a copper sulphide matte and/or a copper sulphide concentrate to blister copper comprising the steps of:

adding the matte and/or concentrate together with a suitable flux to an agitated continuous molten slag phase into which the matte and/or concentrate is dispersed, and with which the matte and/or concentrate reacts, the continuous slag phase floating on a continuous molten blister copper phase, an interface being located between the continuous slag phase and the continuous blister copper phase;

injecting by means of a submerged lance an oxidizing gas capable of reacting with the continuous slag phase and continuous blister copper phase, the continuous slag phase in turn reacting with the matte or concentrate to form a blister copper containing a low sulphur content, slag and sulphur dioxide, said oxidizing gas agitating said continuous slag phase and said continuous blister copper phase;

the lance tip being located deep within the continuous slag phase, the depth of the lance tip being adjusted relative to the slag/blister copper interface so as to minimize the percentage of sulphur in the blister copper at a target copper-in-slag concentration and at a depth adjacent to said interface so as to ensure that a substantial portion of the gas contacts the blister copper phase; and separating blister copper from the continuous slag phase.

6. A process according to claim 5 wherein the reaction is conducted in a furnace, and the blister copper forms a layer on the bottom of the furnace with the slag floating on the top.

7. A process according to claim 5 wherein the slag is highly oxidized and is comprised mainly of a solution of copper oxide, calcium oxide, ferric and ferrous oxides, and silica.

8. A process according to claim 5 wherein the copper sulphide matte added to the molten bath is comprised of a mixture of $Cu_2S$ and $FeS$.

9. A process according to claim 5 wherein the copper sulphide matte is produced by smelting copper sulphide concentrates in a smelting furnace.

10. A process according to claim 5 wherein the copper sulphide matte added is granulated prior to addition to the molten bath.

11. A process according to claim 5 wherein the matte and/or concentrate has an average particle size of less than 25 mm.

12. A process according to claim 5 wherein the matte and/or concentrate is fed to the top surface of the molten bath.

13. A process according to claim 5 wherein the flux is limestone or silica and the oxidizing gas is air or oxygen enriched air.

14. A process according to claim 5 wherein the oxidizing gas is injected vertically downward to beneath the surface of the slag by means of one or more lances.

15. A process according to claim 5 wherein the lance tip is positioned in the molten bath in the slag phase adjacent the blister copper phase.

16. A process according to claim 5 wherein the oxidizing gas provides an oxygen stoichiometry of from 90% to 120%.

17. A process according to claim 5 wherein the slag contains calcium oxide, iron and silica and the ratio of CaO/Fe in the slag is of the order of from 0.15 to 0.7 and the weight ratio of $CaO/SiO_2$ is of the order of from 5 to 10.

18. A process according to claim 5 wherein the matte is maintained as a dispersion on the slag phase.

19. A process according to claim 18 wherein the matte is maintained as a dispersion by operating the process by feeding matte in particulate form onto the surface of the molten bath, maintaining a deep slag phase, insuring the slag is well agitated by the injected gas and injecting a substantial portion of the oxygen into the blister copper phase via a deeply submerged lance.

20. A process according to claim 5 further comprising adding lump coal to the bath to create another reaction zone in the slag where reduction may occur.

21. A process according to claim 5 wherein the amount of sulphur in the final blister copper is less than 0.1 wt %.

22. A process according to claim 5 wherein the amount of sulphur in the final blister copper is within a factor of 2 of the equilibrium value for a given percentage of copper in the slag.

* * * * *